(12) United States Patent
Kuriyama et al.

(10) Patent No.: US 8,440,101 B2
(45) Date of Patent: May 14, 2013

(54) LIQUID CRYSTAL COMPOSITION CONTAINING POLYMERIZABLE COMPOUND AND LIQUID CRYSTAL DISPLAY ELEMENT USING THE SAME

(75) Inventors: Takeshi Kuriyama, Kitaadachi-gun (JP); Shinichi Hirata, Kitaadachi-gun (JP); Shotaro Kawakami, Kitaadachi-gun (JP)

(73) Assignee: DIC Corporation, Tokyo (JP)

( * ) Notice: Subject to any disclaimer, the term of this patent is extended or adjusted under 35 U.S.C. 154(b) by 150 days.

(21) Appl. No.: 13/017,328

(22) Filed: Jan. 31, 2011

(65) Prior Publication Data

US 2011/0186776 A1 Aug. 4, 2011

(30) Foreign Application Priority Data

Feb. 4, 2010 (JP) ................................ 2010-023011

(51) Int. Cl.
*C09K 19/00* (2006.01)
*C09K 19/06* (2006.01)
*C09K 19/34* (2006.01)
*C09K 19/52* (2006.01)
*G02F 1/1333* (2006.01)

(52) U.S. Cl.
USPC .............. 252/299.01; 252/299.6; 252/299.61; 252/299.62; 252/299.63; 252/299.66; 428/1.1; 428/1.3; 349/1; 349/86; 349/182

(58) Field of Classification Search ............. 252/299.01, 252/299.6, 299.61, 299.62, 299.63, 299.66; 428/1.1, 1.3; 349/1, 86, 182

See application file for complete search history.

(56) References Cited

FOREIGN PATENT DOCUMENTS

| JP | 2003-307720 A | 10/2003 |
|---|---|---|
| JP | 2004-302096 A | 10/2004 |
| JP | 2008-116931 A | 5/2008 |

*Primary Examiner* — Geraldina Visconti
(74) *Attorney, Agent, or Firm* — Edwards Wildman Palmer LLP

(57) ABSTRACT

Provided are a liquid crystal composition containing, as a first component, a polymerizable compound represented by general formula (I):

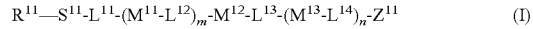

and a liquid crystal display element using the liquid crystal composition.

20 Claims, No Drawings

US 8,440,101 B2

LIQUID CRYSTAL COMPOSITION CONTAINING POLYMERIZABLE COMPOUND AND LIQUID CRYSTAL DISPLAY ELEMENT USING THE SAME

BACKGROUND OF THE INVENTION

1. Field of the Invention

The present invention relates to a liquid crystal composition containing a polymerizable compound and a liquid crystal display element using the liquid crystal composition.

2. Description of the Related Art

Polymer sustained alignment (PSA) liquid crystal display elements have a structure in which a polymer structure is formed in a cell in order to control the pretilt angle of liquid crystal molecules, and are expected to become next-generation liquid crystal display elements because of their high-speed responsiveness and high contrast.

Such a PSA liquid crystal display element is produced by injecting a polymerizable composition containing a liquid crystal compound and a polymerizable compound between substrates, and polymerizing the polymerizable compound while aligning liquid crystal molecules by applying a voltage, thus fixing the alignment of the liquid crystal molecules. Examples of the causes of image sticking, which is display damage of this PSA liquid crystal display element, include impurities and a change in the alignment of liquid crystal molecules (i.e., change in the pretilt angle).

Image sticking due to impurities is caused by a residual polymerizable compound due to incomplete polymerization and a polymerization initiator added for the purpose of accelerating the progress of the polymerization. Therefore, it is necessary to minimize the amount of polymerizable compound remaining after the polymerization and to suppress the amount of polymerization initiator added. For example, when a large amount of polymerization initiator is added in order to completely carry out the polymerization, a voltage-holding ratio of the resulting display element is decreased by the residual polymerization initiator, resulting in an adverse effect on the display quality. On the other hand, when the amount of polymerization initiator used in the polymerization is reduced in order to suppress the decrease in the voltage-holding ratio, the polymerizable compound remains because the polymerization does not completely proceed, and thus image sticking due to the residual polymerizable compound inevitably occurs. In order to suppress the amount of residual polymerizable compound by completely curing a polymerizable compound with a small amount of polymerization initiator added, a method of applying a large amount of energy may be employed, specifically, for example, strong ultraviolet light may be applied for a long time during the polymerization. In this case, however, in addition to an increase in the size of a production apparatus and a decrease in the production efficiency, degradation of a liquid crystal material due to ultraviolet light or the like may be caused. Thus, in liquid crystal compositions containing a polymerizable compound in the related art, it is difficult to reduce both the amount of residual uncured polymerizable compound and the amount of residual polymerization initiator at the same time. Accordingly, it has been desired to develop a liquid crystal composition containing a polymerizable compound that is completely polymerized without using a polymerization initiator.

Meanwhile, it is also known that image sticking may be caused by a change in the pretilt angle of liquid crystal molecules in a liquid crystal composition containing a polymerizable compound. Specifically, in the case where a polymer obtained by curing a polymerizable compound is flexible, when a display element is fabricated and a certain pattern is continued to be displayed for a long time, the structure of the polymer changes. As a result, the pretilt angle of liquid crystal molecules changes. Since such a change in the pretilt angle may become a cause of image sticking, it is necessary to use a polymerizable compound that forms a polymer which has a rigid structure and whose structure does not change.

Hitherto, in order to prevent image sticking by improving the rigidity of a polymer, a display element has been constituted by using a polymerizable compound having a structure, such as a 1,4-phenylene group, having only a ring structure and polymerizable functional groups (refer to Japanese Unexamined Patent Application Publication No. 2003-307720) and a display element has been constituted by using a polymerizable compound having a biaryl structure (refer to Japanese Unexamined Patent Application Publication No. 2008-116931). However, these polymerizable compounds have low compatibility with liquid crystal compounds, and thus deposition of the polymerizable compounds occurs when a liquid crystal composition is prepared. Thus, it is difficult to apply these polymerizable compounds to a liquid crystal composition suitable for practical use.

In addition, in order to prevent image sticking by improving the rigidity of a polymer, it has been proposed that a display element is constituted by using a mixed liquid crystal composition containing a bifunctional polymerizable compound and a trifunctional or higher functional polymerizable compound such as dipentaerythritol pentaacrylate or dipentaerythritol hexaacrylate (refer to Japanese Unexamined Patent Application Publication No. 2004-302096). However, since dipentaerythritol pentaacrylate and dipentaerythritol hexaacrylate have no ring structure in their molecules, the affinity of these polymerizable compounds with liquid crystal compounds is weak and a force to control the alignment is also weak. Accordingly, sufficient alignment stability is not achieved. Furthermore, it is essential to add a polymerization initiator in polymerization of these polymerizable compounds. Unless a polymerization initiator is added, these polymerizable compounds remain after the polymerization.

As described above, it is difficult to satisfy characteristics desired in polymerizable-compound-containing liquid crystal compositions, such as image sticking characteristics of a display element, alignment stability, stability of the composition having such a property that a precipitate is not produced, and the production efficiency in the fabrication of a PSA liquid crystal display element, and this difficulty inhibits practical application of this display element.

SUMMARY OF THE INVENTION

Accordingly, it is an object of the present invention to provide a polymerizable-compound-containing liquid crystal composition that has a strong force to control the liquid crystal alignment after polymerization and that does not cause damage such as image sticking. It is another object of the present invention to provide a polymerizable-compound-containing liquid crystal composition in which a polymerizable compound is satisfactorily compatible with liquid crystal materials and a problem such as deposition does not occur. Furthermore, it is another object of the present invention to provide a liquid crystal display element to which a liquid crystal alignment capability is provided by polymerization of a polymerizable-compound-containing liquid crystal composition, the liquid crystal display element having a good display performance.

As a result of intensive studies on various polymerizable compounds and various non-polymerizable liquid crystal compounds, the inventors of the present invention found that a polymerizable-compound-containing liquid crystal composition containing a polymerizable compound and a non-polymerizable liquid crystal compound which have specific structures can achieve the above objects, and this finding led to the realization of the present invention.

Specifically, the present invention provides a polymerizable-compound-containing liquid crystal composition described below and a liquid crystal display element using the liquid crystal composition.

The polymerizable-compound-containing liquid crystal composition contains, as a first component, at least one compound selected from polymerizable compounds represented by general formula (I):

$$R^{11}-S^{11}-L^{11}-(M^{11}-L^{12})_m-M^{12}-L^{13}-(M^{13}-L^{14})_n-Z^{11} \quad (I)$$

(wherein $R^{11}$ represents a group selected from groups represented by formulae (R-1) to (R-15):

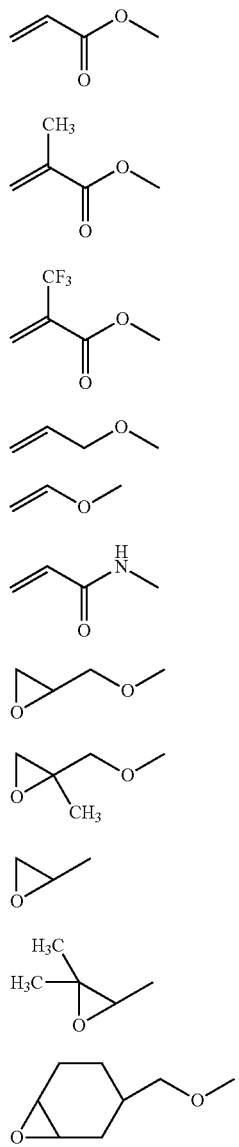

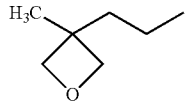

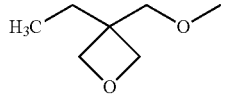

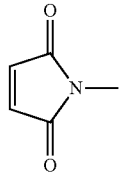

$S^{11}$ represents an alkylene group having 1 to 12 carbon atoms or a single bond, where a methylene group in the alkylene group may be substituted with an oxygen atom, —COO—, —OCO—, or —OCOO— as long as oxygen atoms are not directly bonded to each other, $Z^{11}$ represents a hydrogen atom, a fluorine atom, a chlorine atom, a cyano group, a thiocyanate group, a trifluoromethoxy group, a trifluoromethyl group, a difluoromethoxy group, or an alkyl group having 1 to 12 carbon atoms where a methylene group in the alkyl group may be substituted with an oxygen atom, a sulfur atom, —CO—, —COO—, —OCO—, —OCOO—, —CH═CH—, or —C≡C— as long as oxygen atoms are not directly bonded to each other, or $Z^{11}$ represents —$S^{12}$—$R^{12}$ (where $R^{12}$ independently represents the same group as that represented by $R^{11}$, and $S^{12}$ independently represents the same group or bond as that represented by $S^{11}$), $L^{11}$, $L^{12}$, and $L^{14}$ each independently represent a single bond, —O—, —S—, —CH$_2$—, —OCH$_2$—, —CH$_2$O—, —CO—, —C$_2$H$_4$—, —COO—, —CO—, —OCOOCH$_2$—, —CH$_2$OCOO—, —CO—NR$^a$—, —NR$^a$—CO—, —SCH$_2$—, —CH$_2$S—, —CH═CH—COO—, —COO—CH═CH—, —OCO—CH═CH—, —CH═CH—OCO—, —CH═CCH$_3$—COO—, —COO—CCH$_3$═CH—, —OCO—CCH$_3$═CH—, —CH═CCH$_3$—OCO—, —COOC$_2$H$_4$—, —OCOC$_2$H$_4$—, —C$_2$H$_4$OCO—, —C$_2$H$_4$COO—, —OCOCH$_2$—, —CH$_2$COO—, —CH$_2$OCO—, —COOCH$_2$—, —CH═CH—, —CF═CF—, —CF═CH—, —CH═CF—, —CF$_2$—, —CF$_2$O—, —OCF$_2$—, —CF$_2$CH$_2$—, —CH$_2$CF$_2$—, —CF$_2$CF$_2$—, or —C≡C— (where R$^a$ represents an alkyl group having 1 to 4 carbon atoms), $L^{13}$ represents —COOC$_2$H$_4$—, —OCOC$_2$H$_4$—, —C$_2$H$_4$OCO—, or —C$_2$H$_4$COO—, $M^{11}$ and $M^{13}$ each independently represent a 1,4-phenylene group, a 1,4-cyclohexylene group, a pyridine-2,5-diyl group, a pyrimidine-2,5-diyl group, a piperidine-2,5-diyl group, a naphthalene-2,6-diyl group, an indane-2,5-diyl group, a tetrahydronaphthalene-2,6-diyl group, or a 1,3-dioxane-2,5-diyl group, $M^{11}$ and $M^{13}$ may each be independently unsubstituted, or a hydrogen atom contained in any of these groups independently represented by $M^{11}$ and $M^{13}$ may be substituted with an alkyl group, a halogenated alkyl group, an alkoxy group, a halogenated alkoxy group, a halogen atom, a cyano group, or a nitro group, $M^{12}$ represents a 1,4-phenylene group or a naphthalene-2,6-diyl group, $M^{12}$ may be unsubstituted, or a hydrogen atom contained in the 1,4-phenylene group or the naphthalene-2,6-diyl group may be substituted with an alkyl group, a halogenated alkyl group, an alkoxy group, a halogenated alkoxy group, a halogen atom, a cyano group, or a nitro group, m represents 0 or 1, n represents 1, 2, or 3, when n represents 2 or 3, $M^{13}$s, the number of which is 2 or 3, may be the same or different and $L^{14}$s, the number of which is 2 or 3, may be the same or different);

as a second component, at least one compound represented by general formula (II):

(wherein $R^{21}$ and $R^{22}$ each independently represent an alkyl group having 1 to 10 carbon atoms or an alkenyl group having 2 to 10 carbon atoms, one methylene group or two or more non-adjacent methylene groups in the alkyl group or the alkenyl group may each be substituted with —O— or —S—, and one or more hydrogen atoms in the alkyl group or the alkenyl group may each be substituted with a fluorine atom or a chlorine atom, $M^{21}$, $M^{22}$, and $M^{23}$ each independently represent a group selected from the group consisting of (a) a trans-1,4-cyclohexylene group (where one methylene group or two or more non-adjacent methylene groups in the trans-1,4-cyclohexylene group may each be substituted with —O— or —S—), (b) a 1,4-phenylene group (where one —CH═ group or two or more non-adjacent —CH═ groups in the 1,4-phenylene group may be substituted with a nitrogen atom), a 2-fluoro-1,4-phenylene group, a 3-fluoro-1,4-phenylene group, a 3,5-difluoro-1,4-phenylene group, and (c) a 1,4-cyclohexenylene group, a 1,4-bicyclo(2.2.2)octylene group, a piperidine-2,5-diyl group, a naphthalene-2,6-diyl group, a decahydronaphthalene-2,6-diyl group, and a 1,2,3,4-tetrahydronaphthalene-2,6-diyl group, o represents 0, 1, or 2, $L^{21}$ and $L^{22}$ each independently represent a single bond, —CH$_2$CH$_2$—, —(CH$_2$)$_4$—, —OCH$_2$—, —CH$_2$O—, —OCF$_2$—, —CF$_2$O—, —CH═CH—, —CH═N—N═CH—, or —C≡C—, when a plurality of $L^{22}$s is present, $L^{22}$s may be the same or different, and when a plurality of $M^{23}$s is present, $M^{23}$s may be the same or different); and as a third component, at least one compound selected from the group consisting of compounds represented by general formulae (IIIa), (IIIb), and (IIIc):

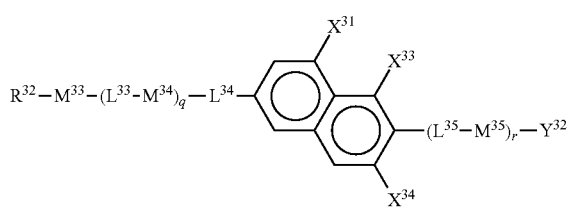

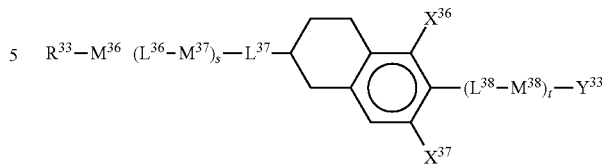

(wherein $R^{31}$, $R^{32}$, and $R^{33}$ each independently represent an alkyl group having 1 to 10 carbon atoms or an alkenyl group having 2 to 10 carbon atoms, one methylene group or two or more non-adjacent methylene groups in the alkyl group or the alkenyl group may each be substituted with —O— or —S—, and one or more hydrogen atoms in the alkyl group or the alkenyl group may each be substituted with a fluorine atom or a chlorine atom, $M^{31}$, $M^{32}$, $M^{33}$, $M^{34}$, $M^{35}$, $M^{36}$, $M^{37}$, and $M^{38}$ each independently represent a group selected from the groups consisting of (d) a trans-1,4-cyclohexylene group (where one methylene group or two or more non-adjacent methylene groups in the trans-1,4-cyclohexylene group may each be substituted with —O— or —S—), (e) a 1,4-phenylene group (where one —CH═ group or two or more non-adjacent —CH═ groups in the 1,4-phenylene group may each be substituted with —N═), a 3-fluoro-1,4-phenylene group, and a 3,5-difluoro-1,4-phenylene group, and (f) a 1,4-cyclohexenylene group, a 1,4-bicyclo(2.2.2)octylene group, a piperidine-2,5-diyl group, a naphthalene-2,6-diyl group, a 1,2,3,4-tetrahydronaphthalene-2,6-diyl group, and a decahydronaphthalene-2,6-diyl group, a hydrogen atom contained in any of the groups (d), (e), and (f) may be substituted with a cyano group, a fluorine atom, a trifluoromethyl group, a trifluoromethoxy group, or a chlorine atom, $L^{31}$, $L^{32}$, $L^{33}$, $L^{34}$, $L^{35}$, $L^{36}$, $L^{37}$, and $L^{38}$ each independently represent a single bond, —COO—, —OCO—, —CH$_2$CH$_2$—, —(CH$_2$)$_4$—, —OCH$_2$—, —CH$_2$O—, —OCF$_2$—, —CF$_2$O—, —C≡C—, or when a plurality of $M^{32}$s, $M^{34}$s, $M^{35}$s, $M^{37}$s, $M^{38}$s, $L^{31}$s, $L^{33}$s, $L^{35}$s, $L^{36}$s, and/or $L^{38}$s are present, they may be the same or different, $X^{31}$, $X^{32}$, $X^{33}$, $X^{34}$, $X^{35}$, $X^{36}$, and $X^{37}$ each independently represent a hydrogen atom or a fluorine atom, $Y^{31}$, $Y^{32}$, and $Y^{33}$ each independently represent a fluorine atom, a chlorine atom, a cyano group, a thiocyanate group, a trifluoromethoxy group, a trifluoromethyl group, a 2,2,2-trifluoroethyl group, or a difluoromethoxy group, p, q, r, s, and t each independently represent 0, 1, or 2, but q+r and s+t are each 2 or less), or at least one compound selected from the group consisting of compounds represented by general formulae (IVa), (IVb), and (IVc):

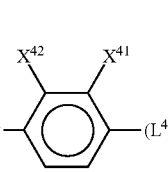

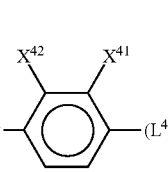

-continued

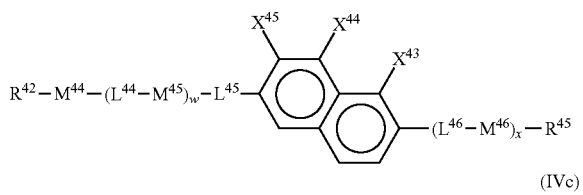

(IVb)

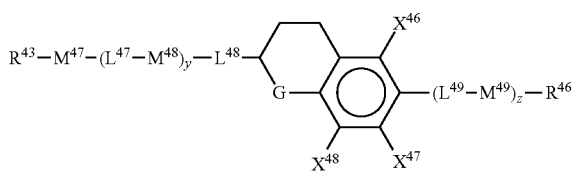

(IVc)

(wherein $R^{41}$, $R^{42}$, $R^{43}$, $R^{44}$, $R^{45}$, and $R^{46}$ each independently represent an alkyl group having 1 to 10 carbon atoms or an alkenyl group having 2 to 10 carbon atoms, one methylene group or two or more non-adjacent methylene groups in the alkyl group or the alkenyl group may each be substituted with —O— or —S—, and one or more hydrogen atoms in the alkyl group or the alkenyl group may each be substituted with a fluorine atom or a chlorine atom,
$M^{41}$, $M^{42}$, $M^{43}$, M", $M^{45}$, $M^{46}$, $M^{47}$, $M^{48}$, and $M^{49}$ each independently represent a group selected from the groups consisting of
(g) a trans-1,4-cyclohexylene group (where one methylene group or two or more non-adjacent methylene groups in the trans-1,4-cyclohexylene group may each be substituted with —O— or —S—),
(h) a 1,4-phenylene group (where one —CH= group or two or more non-adjacent —CH= groups in the 1,4-phenylene group may each be substituted with a nitrogen atom), and
(i) a 1,4-cyclohexenylene group, a 1,4-bicyclo(2.2.2)octylene group, a piperidine-2,5-diyl group, a naphthalene-2,6-diyl group, a 1,2,3,4-tetrahydronaphthalene-2,6-diyl group, and a decahydronaphthalene-2,6-diyl group, a hydrogen atom contained in any of these groups (g), (h), and (i) may be substituted with a cyano group, a fluorine atom, a trifluoromethyl group, a trifluoromethoxy group, or a chlorine atom,
$L^{41}$, $L^{42}$, $L^{43}$, $L^{44}$, $L^{45}$, $L^{46}$, $L^{47}$, $L^{48}$, and $L^{49}$ each independently represent a single bond, —COO—, —OCO—, —CH$_2$CH$_2$—, —(CH$_2$)$_4$—, —OCH$_2$—, —CH$_2$O—, —OCF$_2$—, —CF$_2$O—, or —C≡C—, when a plurality of $M^{42}$s, $M^{43}$s, $M^{45}$s, $M^{46}$s, $M^{48}$s, $M^{49}$s, $L^{41}$s, $L^{43}$s, $L^{44}$s, $L^{46}$s, $L^{47}$s and/or $L^{49}$s are present, they may be the same or different,
$X^{41}$ and $X^{42}$ each independently represent a trifluoromethyl group, a trifluoromethoxy group, or a fluorine atom, $X^{43}$, $X^{44}$, $X^{45}$, $X^{46}$, $X^{47}$ and $X^{48}$ each independently represent a hydrogen atom, a trifluoromethyl group, a trifluoromethoxy group, or a fluorine atom, however, at least one of $X^{41}$ and $X^{42}$ represents a fluorine atom, one of $X^{43}$, $X^{44}$, and $X^{45}$ represents a fluorine atom, one of $X^{46}$, $X^{47}$, and $X^{48}$ represents a fluorine atom, $X^{46}$ and $X^{47}$ do not represent fluorine atoms at the same time, and $X^{46}$ and $X^{48}$ do not represent fluorine atoms at the same time,
G represents a methylene group or —O—,
u, v, w, x, y, and z each independently represent 0, 1, or 2, but u+v, w+x, and y+z are each 2 or less).

Since the polymerizable compound which is an essential component of the present invention has a good compatibility with other non-polymerizable liquid crystal compounds, a stable liquid crystal composition can be provided. In addition, the polymerizable compound has a skeleton similar to that of a liquid crystal compound, and thus has a strong force to control the alignment of the liquid crystal compound. Furthermore, according to the liquid crystal composition containing the polymerizable compound, the polymerizable compound can be polymerized without using a photoinitiator or by adding a very small amount of a photoinitiator, and an unpolymerized polymerizable compound does not remain after polymerization or the amount of such an unpolymerized polymerizable compound is very small. In addition, energy necessary for the polymerization of the polymerizable compound can be significantly reduced. Consequently, it is possible to markedly reduce display damage of a liquid crystal display element to which alignment is provided by polymerizing a polymerizable compound in a liquid crystal material. It is also possible to reduce the energy cost for the production and to improve the production efficiency. Thus, the liquid crystal composition containing the polymerizable compound is useful as a liquid crystal material for the liquid crystal display element.

DESCRIPTION OF THE PREFERRED EMBODIMENTS

A polymerizable compound used as a first component in a polymerizable-compound-containing liquid crystal composition according to the present invention is a compound represented by general formula (I). In general formula (I), $R^{11}$ represents a polymerizable group. Specific examples of the polymerizable group include structures shown below.

(R-1)

(R-2)

(R-3)

(R-4)

(R-5)

(R-6)

(R-7)

(R-8)

(R-9)

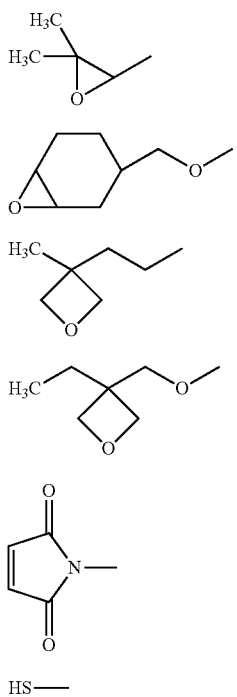

(R-10)

(R-11)

(R-12)

(R-13)

(R-14)

(R-15)

HS—

These polymerizable groups are cured by radical polymerization, radical addition polymerization, cationic polymerization, and anionic polymerization. In particular, when ultraviolet polymerization is conducted as a polymerization method, the polymerizable group represented by formula (R-1), formula (R-2), formula (R-4), formula (R-5), formula (R-7), formula (R-11), formula (R-13), or formula (R-15) is preferable, the polymerizable group represented by formula (R-1), formula (R-2), formula (R-7), formula (R-11), or formula (R-13) is more preferable, and the polymerizable group represented by formula (R-1) or formula (R-2) are still more preferable.

$S^{11}$ represents a spacer group or a single bond. The spacer group is preferably an alkylene group having 1 to 12 carbon atoms or a single bond. A methylene group in the alkylene group may be substituted with an oxygen atom, —COO—, —OCO—, or —OCOO— as long as oxygen atoms are not directly bonded to each other. In order to reduce the amount of change in the pretilt angle, $S^{11}$ is preferably a single bond or an alkylene group having 1 to 4 carbon atoms. In contrast, in order to improve the solubility, $S^{11}$ is preferably a methylene group having a certain degree of length. However, if the length of the methylene group is too long, flexibility of the resulting polymer after polymerization increases, which may become a cause of image sticking. For this reason, in order to improve the solubility, $S^{11}$ is preferably an alkylene group having 1 to 8 carbon atoms, and more preferably an alkylene group having 1 to 5 carbon atoms.

The value of m is preferably 0, 1, or 2, and more preferably 0 or 1. The value of n is preferably 1, 2, or 3, and more preferably 1 or 2. When an improvement of the compatibility of the polymerizable compound with other components is particularly desired, the value of m+n is preferably 1 or 2. When an improvement of the force to control the alignment of liquid crystal molecules is particularly desired, the value of m+n is preferably 2 or 3. When the compatibility with other components is low, for example, deposition of the polymerizable compound occurs during the transportation or during the production of a liquid crystal display element, which may cause a change in the content of the polymerizable compound or display damage. When the alignment-controlling force is low, for example, the alignment of liquid crystal molecules changes, which may become a cause of display damage.

Preferably, $L^{11}$, $L^{12}$, and $L^{14}$ are each independently a single bond, —O—, —S—, —CH$_2$—, —OCH$_2$—, —CH$_2$O—, —CO—, —C$_2$H$_4$—, —COO—, —OCO—, —OCOOCH$_2$—, —CH$_2$OCOO—, —CO—NR$^{111}$—, —NR$^{111}$—CO—, —SCH$_2$—, —CH$_2$S—, —CH=CH—COO—, —COO—CH=CH—, —OCO—CH=CH—, —COOC$_2$H$_4$—, —OCOC$_2$H$_4$—, —C$_2$H$_4$OCO—, —C$_2$H$_4$COO—, —OCOCH$_2$—, —CH$_2$COO—, —CH=CH—, —CF=CH—, —CH=CF—, —CF$_2$—, —CF$_2$O—, —OCF$_2$—, —CF$_2$CH$_2$—, —CH$_2$CF$_2$—, —CF$_2$CF$_2$—, or —C≡C— (wherein $R^{111}$ represents an alkyl group having 1 to 4 carbon atoms). More preferably, $L^{11}$, $L^{12}$, and $L^{14}$ are each independently a single bond, —O—, —OCH$_2$—, —CH$_2$O—, —CO—, —C$_2$H$_4$—, —COO—, —OCO—, —OCOOCH$_2$—, —CH$_2$OCOO—, —CH=CH—COO—, —COO—CH=CH—, —OCO—CH=CH—OCO—, —CH=CCH$_3$—COO—, —COO—CCH$_3$=CH—, —OCO—CCH$_3$=CH—, —CH=CCH$_3$—OCO—, —COOC$_2$H$_4$—, —OCOC$_2$H$_4$—, C$_2$H$_4$OCO—, —C$_2$H$_4$COO—, —OCOCH$_2$—, CH$_2$COO—, or —CH=CH—. Still more preferably, $L^{11}$, $L^{12}$, and $L^{14}$ are each independently a single bond, —O—, —OCH$_2$—, —CH$_2$O—, —CH=CH—COO—, —COO—CH=CH—, —OCO—CH=CH—OCO—, —COOC$_2$H$_4$—, —COOC$_2$H$_4$—, —C$_2$H$_4$OCO—, —C$_2$H$_4$COO—, —OCOCH$_2$—, —CH$_2$COO—, or —CH=CH—. When a plurality of $L^{12}$s are present, $L^{12}$s may be the same or different. When a plurality of $L^{14}$s are present, $L^{14}$s may be the same or different.

$Z^{11}$ is preferably H, F, Cl, CN, SCN, OCF$_3$, an alkyl group which having 1 to 12 carbon atoms where a methylene group in the alkyl group may be substituted with an oxygen atom, a sulfur atom, —CO—, —COO—, —OCO—, —OCOO—, —CH=CH—, or —C≡C— as long as oxygen atoms are not directly bonded to each other, or $Z^{11}$ is —S$^{12}$—R$^{12}$. $Z^{11}$ is more preferably H, F, an alkyl group which has 1 to 12 carbon atoms and in which a methylene group may be substituted with an oxygen atom, a sulfur atom, —CO—, —COO—, —OCO—, —OCOO—, —CH=CH—, or —C≡C— as long as oxygen atoms are not directly bonded to each other, or —S$^{12}$—R$^{12}$. Furthermore, $Z^{11}$ is still more preferably a hydrogen atom, an alkyl group which has 1 to 12 carbon atoms and in which a methylene group may be substituted with an oxygen atom as long as oxygen atoms are not directly bonded to each other, or —S$^{12}$—R$^{12}$. $R^{12}$ independently represents the same group as that represented by $R^{11}$, and $S^{12}$ independently represents the same group or bond as that represented by $S^{11}$. When $Z^{11}$ is —S$^{12}$—R$^{12}$, $S^{11}$ and $S^{12}$ each independently represent a spacer group or a single bond as in the above case. In this case, the spacer group is preferably an alkylene group having 2 to 12 carbon atoms or a single bond, and more preferably an alkylene group having 2 to 12 carbon atoms where a methylene group in the alkylene group may be substituted with an oxygen atom, —COO—, —OCO—, or —OCOO— as long as oxygen atoms are not directly bonded to each other, or a single bond.

$M^{11}$ and $M^{13}$ each independently represent a 1,4-phenylene group, a 1,4-cyclohexylene group, a pyridine-2,5-diyl group, a pyrimidine-2,5-diyl group, a piperidine-2,5-diyl group, a naphthalene-2,6-diyl group, an indane-2,5-diyl group, a tetrahydronaphthalene-2,6-diyl group, or a 1,3-dioxane-2,5-diyl group. $M^{11}$ and $M^{13}$ may each be independently unsubstituted, or a hydrogen atom contained in any of these groups independently represented by $M^{11}$ and $M^{13}$ may be substituted with an alkyl group, a halogenated alkyl group, an alkoxy group, a halogenated alkoxy group, a halogen atom, a cyano group, or a nitro group. When a plurality of $M^{11}$s are present, $M^{11}$s may be the same or different. When a plurality of $M^{13}$s are present, $M^{13}$s may be the same or different. Preferably, $M^{11}$ and $M^{13}$ are each independently an unsubstituted 1,4-phenylene group or 1,4-cyclohexylene group or a 1,4-phenylene group or 1,4-cyclohexylene group in which a hydrogen atom may be substituted with a fluorine atom, an alkyl group, or an alkoxy group. When a plurality of $M^{11}$s are present, $M^{11}$s may be the same or different. When a plurality of $M^{13}$s are present, $M^{13}$s may be the same or different.

$M^{12}$ represents a 1,4-phenylene group or a naphthalene-2,6-diyl group. $M^{12}$ may be unsubstituted, or a hydrogen atom contained in the 1,4-phenylene group or naphthalene-2,6-diyl group represented by $M^{12}$ may be substituted with an alkyl group, a halogenated alkyl group, an alkoxy group, a halogenated alkoxy group, a halogen atom, a cyano group, or a nitro group. Preferably, $M^{12}$ is an unsubstituted 1,4-phenylene group or naphthalene-2,6-diyl group or a 1,4-phenylene group or naphthalene-2,6-diyl group in which a hydrogen atom may be substituted with a fluorine atom, an alkyl group, or an alkoxy group.

In order to improve the compatibility with other components, at least one of $M^{11}$ to $M^{13}$ is preferably a trans-1,4-cyclohexylene group or a group in which at least one hydrogen atom is substituted with a fluorine atom, an alkyl group, or an alkoxy group. In order to improve polymerizability, at least two of $M^{11}$ to $M^{13}$ are preferably aromatic rings, and three or more of $M^{11}$ to $M^{13}$ are more preferably aromatic rings. When the polymerizability is high, the irradiation intensity during polymerization can be suppressed, and the amount of residual polymerizable compound is also decreased. Accordingly, the productivity can be improved, degradation of the liquid crystal composition can be prevented, and image sticking can be prevented. Thus, for example, display damage can be reduced.

$L^{13}$ represents $-COOC_2H_4-$, $-COOC_2H_4-$, $-C_2H_4OCO-$, or $C_2H_4COO-$. More preferably, $L^{13}$ is $-OCOC_2H_4-$ or $C_2H_4COO-$.

More specifically, the compounds represented by general formula (I) are preferably compounds represented by general formulae (I-1) to (I-39):

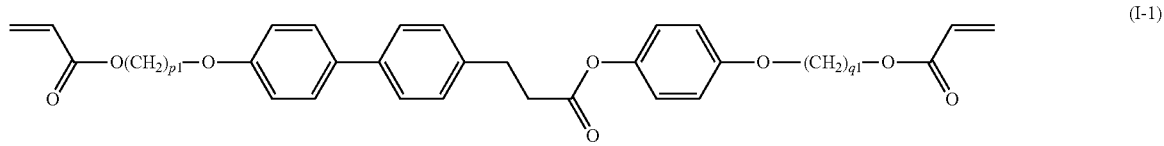

(I-1)

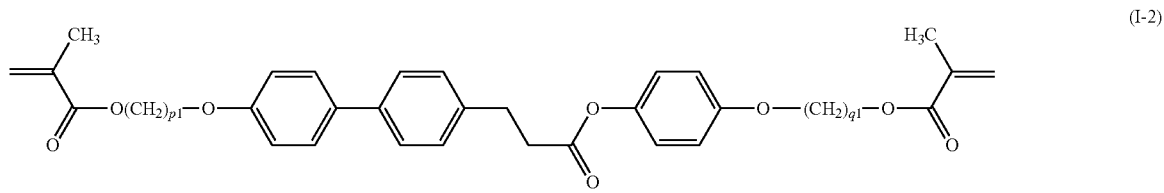

(I-2)

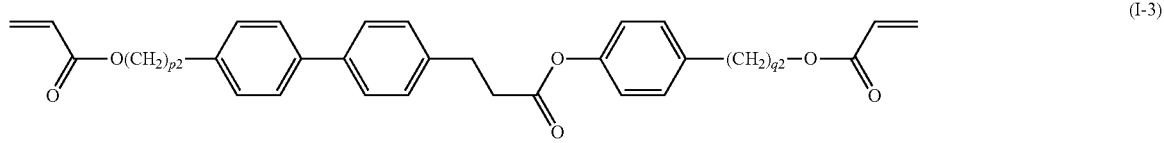

(I-3)

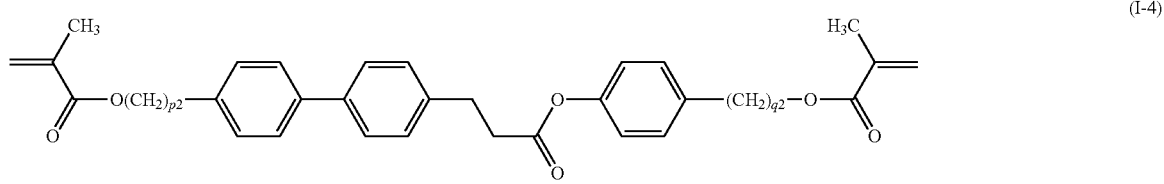

(I-4)

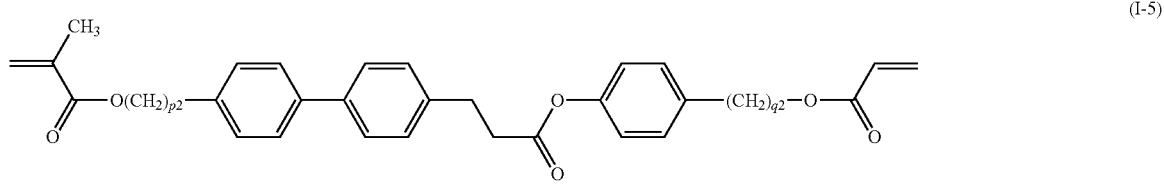

(I-5)

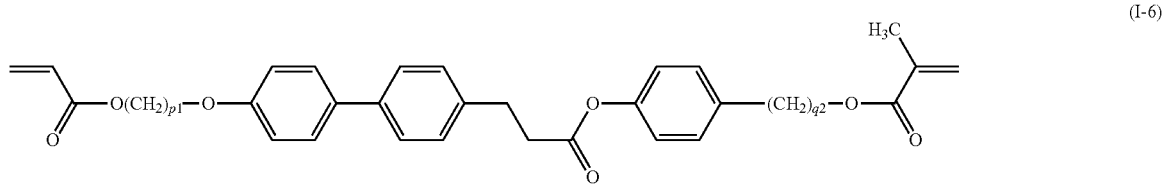

(I-6)

-continued
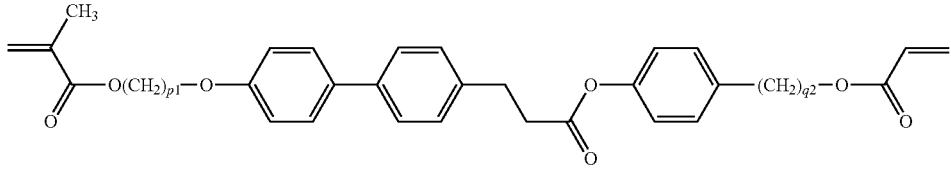
(I-7)
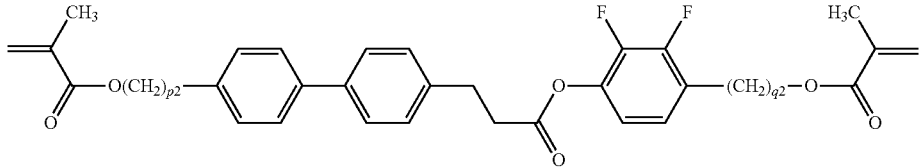
(I-8)
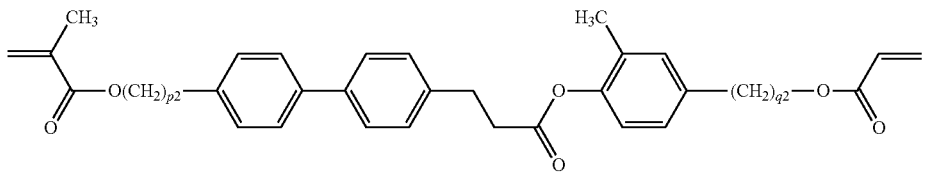
(I-9)
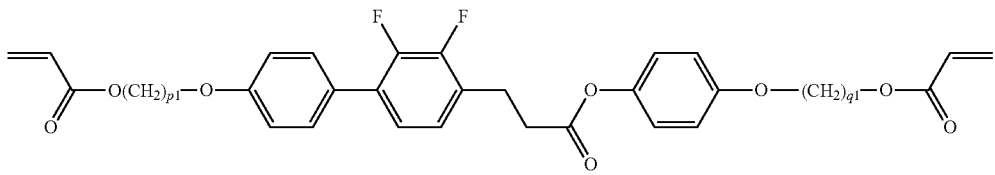
(I-10)
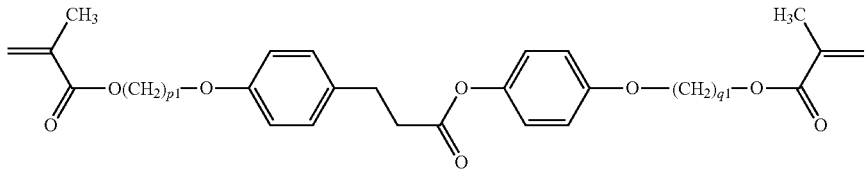
(I-11)
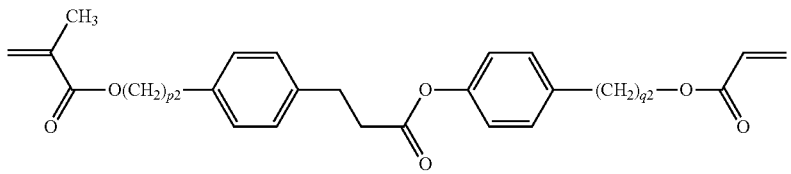
(I-12)
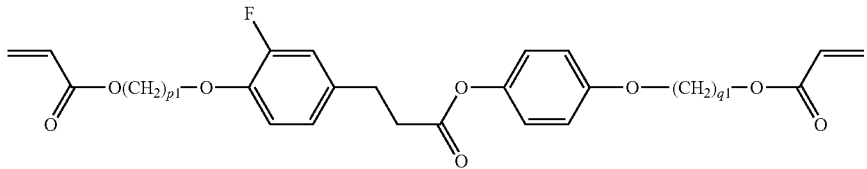
(I-13)
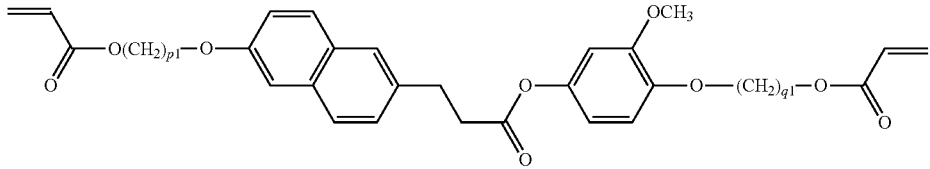
(I-14)

-continued
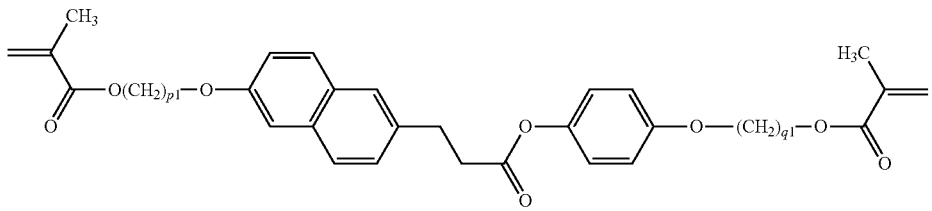
(I-15)
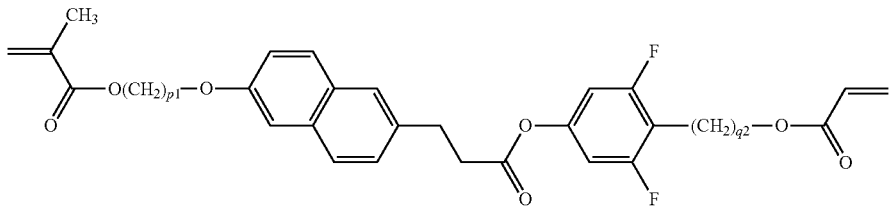
(I-16)
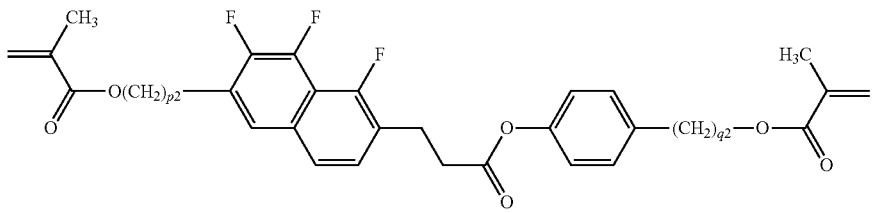
(I-17)
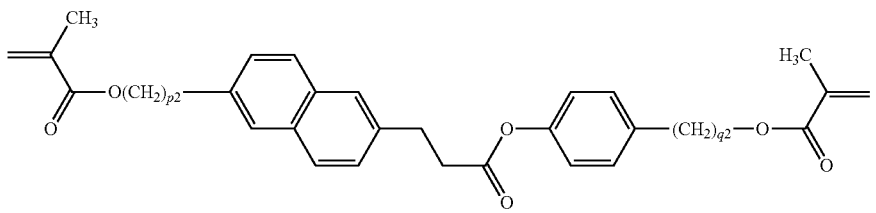
(I-18)
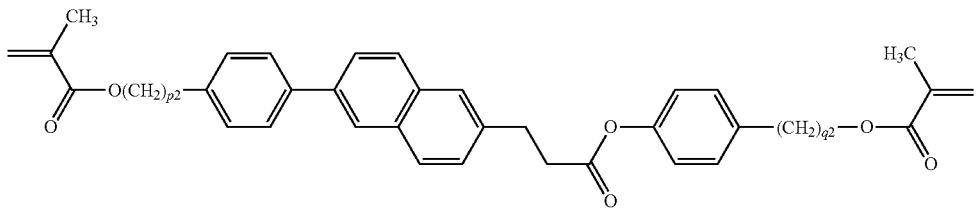
(I-19)
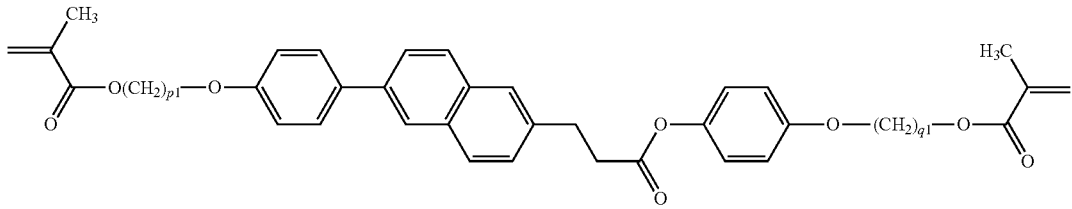
(I-20)
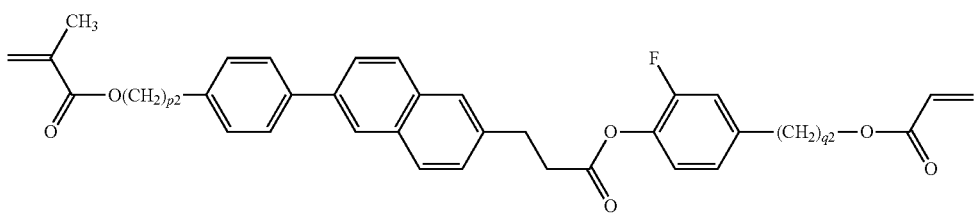
(I-21)

-continued
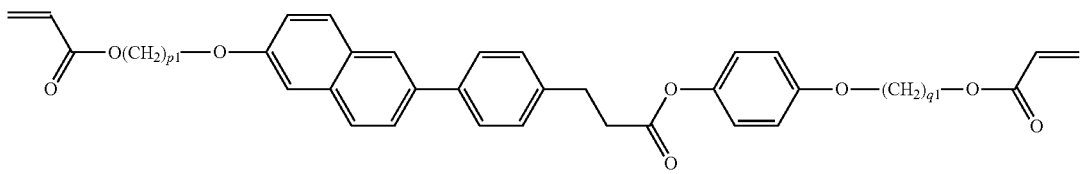
(I-22)
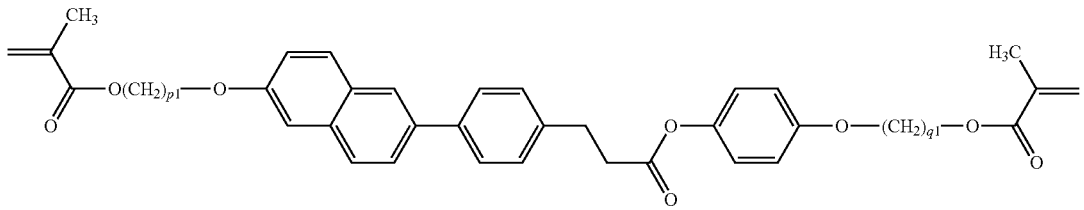
(I-23)
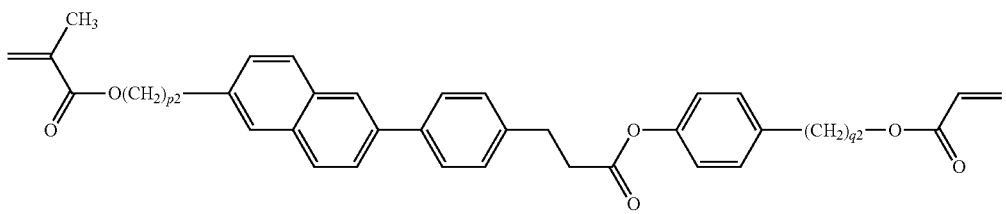
(I-24)
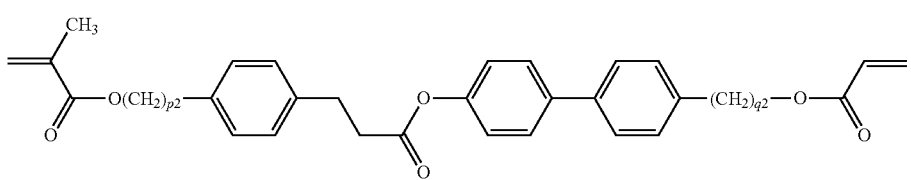
(I-25)
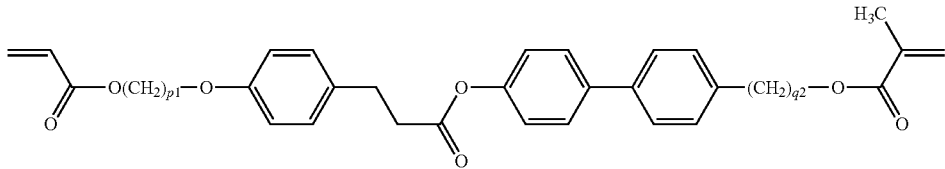
(I-26)
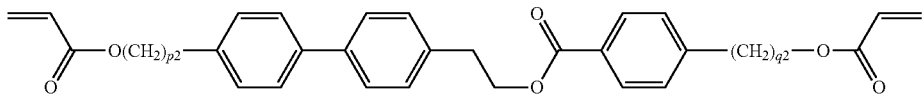
(I-27)
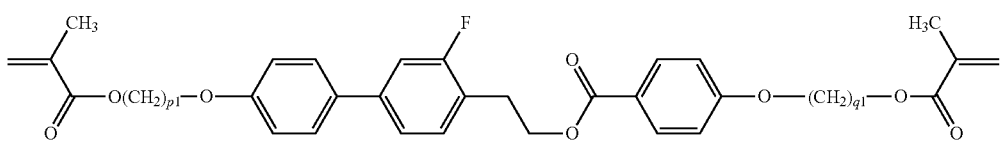
(I-28)
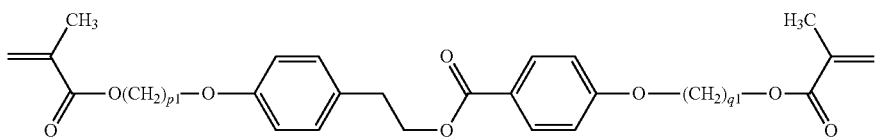
(I-29)
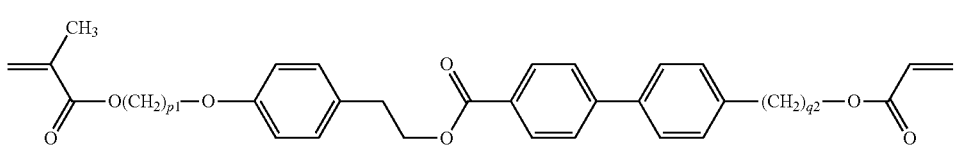
(I-30)

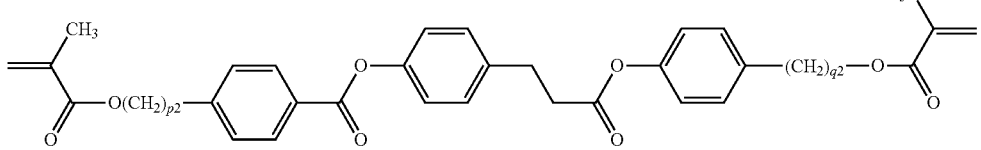

(I-31)

wherein p1 and q1 each independently represent an integer of 1 to 12, and p2 and q2 each independently represent an integer of 0 to 12.

Furthermore, the compounds represented by general formulae (I-1) to (I-18) are more preferable.

The polymerizable-compound-containing liquid crystal composition of the present invention contains at least one polymerizable compound represented by general formula (I). The polymerizable-compound-containing liquid crystal composition of the present invention contains preferably one to five, and particularly preferably one to three polymerizable compounds represented by general formula (I). When the content of the compound represented by general formula (I) is small, the force to control the alignment of non-polymerizable liquid crystal compounds is weakened. When the content of the compound represented by general formula (I) is too large, energy necessary for the polymerization increases, and the amount of polymerizable compound that remains without being polymerized increases. Accordingly, the lower limit of the amount of compound represented by general formula (I) is preferably 0.01% by mass, and more preferably 0.03% by mass. The upper limit thereof is preferably 2.0% by mass, and more preferably 1.0% by mass.

In the compound represented by general formula (II), the compound being used as a second component, $R^{21}$ and $R^{22}$ are each independently preferably an alkyl group having 1 to 10 carbon atoms or an alkenyl group having 2 to 10 carbon atoms (where one methylene group or two or more non-adjacent methylene groups in the alkyl group or the alkenyl group may each be substituted with —O— or —S—, or one or more hydrogen atoms in the alkyl group or the alkenyl group may each be substituted with a fluorine atom or a chlorine atom). Among these, an alkyl group having 1 to 5 carbon atoms, an alkoxy group having 1 to 5 carbon atoms, an alkenyl group having 2 to 5 carbon atoms, or an alkenyloxy group having 3 to 6 carbon atoms is more preferable, and an alkyl group having 1 to 5 carbon atoms or an alkoxy group having 1 to 5 carbon atoms is particularly preferable.

$M^{21}$, $M^{22}$, and $M^{23}$ are each independently preferably a trans-1,4-cyclohexylene group (where one —CH$_2$— group or two or more non-adjacent —CH$_2$— groups in this trans-1,4-cyclohexylene group may each be substituted with an oxygen atom), a 1,4-phenylene group (where one —CH= group or two or more —CH= groups in this 1,4-phenylene group may each be substituted with a nitrogen atom), a 3-fluoro-1,4-phenylene group, a 3,5-difluoro-1,4-phenylene group, a 1,4-cyclohexenylene group, a 1,4-bicyclo(2.2.2)octylene group, a piperidine-1,4-diyl group, a naphthalene-2,6-diyl group, a decahydronaphthalene-2,6-diyl group, or a 1,2,3,4-tetrahydronaphthalene-2,6-diyl group. Among these, a trans-1,4-cyclohexylene group, a 1,4-phenylene group, or a 1,4-bicyclo(2.2.2)octylene group is more preferable, and a trans-1,4-cyclohexylene group or a 1,4-phenylene group is particularly preferable. The value of o is preferably 0, 1, or 2, and more preferably 0 or 1. $L^{21}$ and $L^{22}$ are each independently preferably a single bond, —CH$_2$CH$_2$—, —(CH$_2$)$_4$—, —OCH$_2$—, —CH$_2$O—, —OCF$_2$—, —CF$_2$O—, —CH=CH—, —CH=N—N=CH—, or —C≡C—. Among these, a single bond, —CH$_2$CH$_2$—, —(CH$_2$)$_4$—, —OCH$_2$—, or —CH$_2$O— is more preferable, and a single bond or —CH$_2$CH$_2$— is still more preferable. More specifically, the compounds represented by general formula (II) are preferably compounds represented by the group consisting of general formulae (II-A) to (II-P):

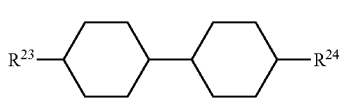

(II-A)

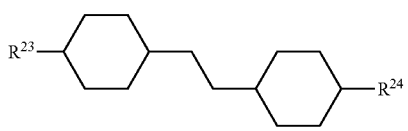

(II-B)

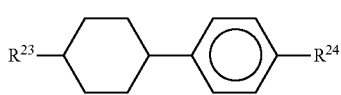

(II-C)

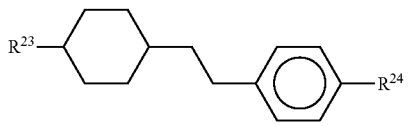

(II-D)

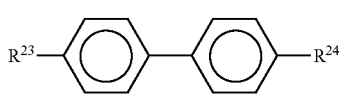

(II-E)

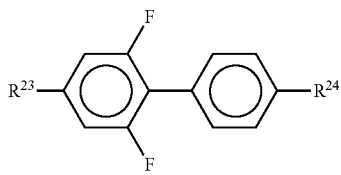

(II-F)

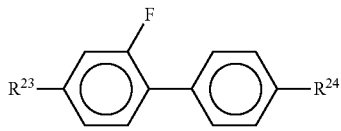

(II-G)

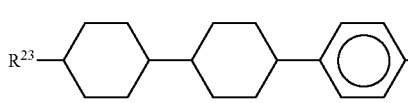

(II-H)

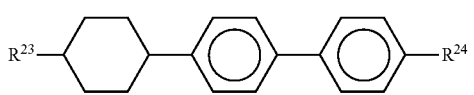

(II-I)

-continued

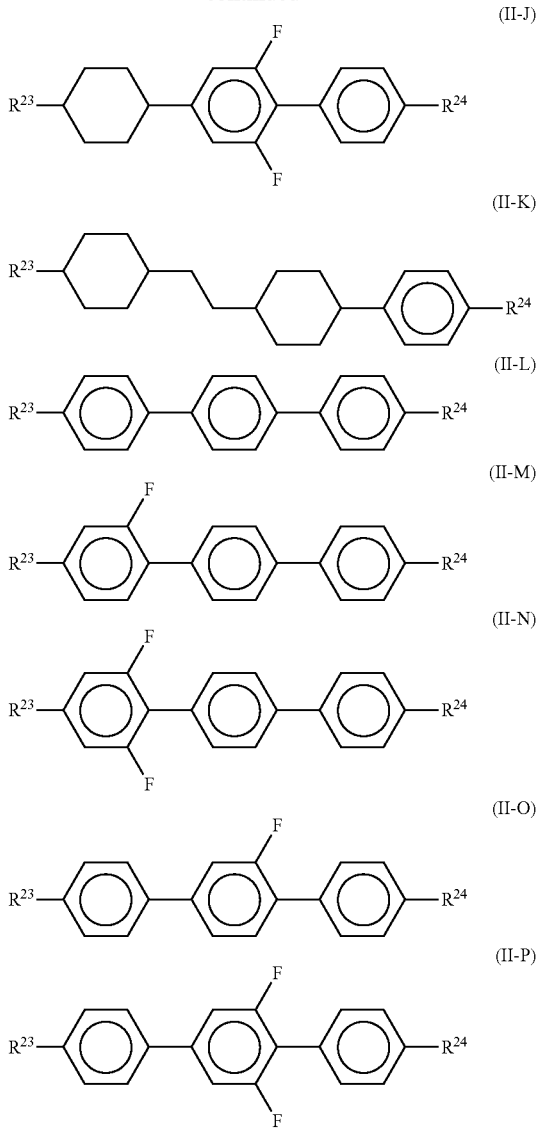

wherein R²³ and R²⁴ each independently represent an alkyl group having 1 to 10 carbon atoms, an alkoxy group having 1 to 10 carbon atoms, an alkenyl group having 2 to 10 carbon atoms, or an alkenyloxy group having 3 to 10 carbon atoms.

$R^{23}$ and $R^{24}$ are each independently more preferably an alkyl group having 1 to 10 carbon atoms, an alkoxy group having 1 to 10 carbon atoms, or an alkenyl group having 2 to 10 carbon atoms, and still more preferably an alkyl group having 1 to 5 carbon atoms or an alkoxy group having 1 to 10 carbon atoms.

Among the compounds represented by general formulae (II-A) to (II-P), compounds represented by general formula (II-A), (II-B), (II-C), (II-E), (II-H), (II-I), or (II-K) is preferable, and compounds represented by general formula (II-A), (II-C), (II-E), (II-H), or (II-I) is more preferable.

The polymerizable-compound-containing liquid crystal composition of the present invention contains at least one compound represented by general formula (II). The polymerizable-compound-containing liquid crystal composition of the present invention contains preferably one to ten, and particularly preferably two to eight compounds represented by general formula (II). The lower limit of the content of the compound represented by general formula (II) is preferably 5% by mass, more preferably 10% by mass, still more preferably 20% by mass, and particularly preferably 30% by mass. The upper limit of the content of the compound represented by general formula (II) is preferably 80% by mass, more preferably 70% by mass, and still more preferably 60% by mass.

In the compounds represented by general formulae (IIIa), (IIIb), and (IIIc), the compound being used as a third component, $R^{31}$, $R^{32}$, and $R^{33}$ are each independently preferably a linear alkyl group having 1 to 15 carbon atoms or an alkenyl group having 2 to 15 carbon atoms (where one methylene group or two or more non-adjacent methylene groups in the linear alkyl group or the alkenyl group may each be substituted with —O— or —S—, and one or more hydrogen atoms in the linear alkyl group or the alkenyl group may each be substituted with a fluorine atom or a chlorine atom), more preferably a linear alkyl group having 1 to 10 carbon atoms, a linear alkoxy group having 1 to 10 carbon atoms, or an alkenyl group having 2 to 10 carbon atoms, and particularly preferably a linear alkyl group having 1 to 8 carbon atoms or an alkoxy group having 1 to 8 carbon atoms.

$M^{31}$, $M^{32}$, $M^{33}$, $M^{34}$, $M^{35}$, $M^{36}$, $M^{37}$, and $M^{38}$ are each independently preferably a trans-1,4-cyclohexylene group (where one methylene group or two or more non-adjacent methylene groups in this trans-1,4-cyclohexylene group may each be substituted with —O— or —S—), a 1,4-phenylene group (where one —CH= group or two or more non-adjacent —CH= groups in this 1,4-phenylene group may each be substituted with a nitrogen atom), a 1,4-cyclohexenylene group, a 1,4-bicyclo(2.2.2)octylene group, a piperidine-1,4-diyl group, a naphthalene-2,6-diyl group, a 1,2,3,4-tetrahydronaphthalene-2,6-diyl group, or a decahydronaphthalene-2,6-diyl group (where a hydrogen atom contained in any of these groups may be substituted with a cyano group, a fluorine atom, a trifluoromethyl group, a trifluoromethoxy group, or a chlorine atom). Among these, a trans-1,4-cyclohexylene group, a 1,4-phenylene group, a 3-fluoro-1,4-phenylene group, or a 3,5-difluoro-1,4-phenylene group is more preferable, a trans-1,4-cyclohexylene group or a 1,4-phenylene group is still more preferable, and a trans-1,4-cyclohexylene group is particularly preferable.

$L^{31}$, $L^{32}$, $L^{33}$, $L^{34}$, $L^{35}$, $L^{36}$, $L^{37}$, and $L^{38}$ are each independently preferably a single bond, —COO—, —OCO—, —CH₂CH₂—, —(CH₂)₄—, —OCH₂—, —CH₂O—, —OCF₂—, —CF₂O—, or —C≡C—. Among these, a single bond, —CH₂CH₂—, —(CH₂)₄—, or —C≡C— is more preferable, and a single bond or —CH₂CH₂— is particularly preferable. $X^{31}$, $X^{32}$, $X^{33}$, $X^{34}$, $X^{35}$, $X^{36}$, and $X^{37}$ each independently represent a hydrogen atom or a fluorine atom. $Y^{31}$, $Y^{32}$, and $Y^{33}$ each independently represent preferably a hydrogen atom, a fluorine atom, a chlorine atom, a cyano group, a thiocyanate group, a trifluoromethoxy group, a trifluoromethyl group, a 2,2,2-trifluoroethyl group, a difluoromethoxy group, or an alkyl group having 1 to 12 carbon atoms, more preferably a hydrogen atom, a fluorine atom, a chlorine atom, a cyano group, a trifluoromethoxy group, a trifluoromethyl group, a 2,2,2-trifluoroethyl group, or an alkyl group having 1 to 12 carbon atoms, and particularly preferably a fluorine atom. The values of p, q, r, s, and t each independently represent 0, 1, or 2, but the values of q+r and s+t each represent 2 or less.

Specifically, the structure represented by general formula (IIIa-1) below is preferable.

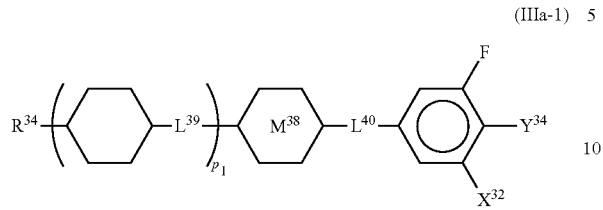
(IIIa-1)

In general formula (IIIa-1), $R^{34}$ represents an alkyl group having 1 to 8 carbon atoms, an alkoxyl group having 1 to 8 carbon atoms, or an alkenyl group having 2 to 8 carbon atoms, $L^{39}$ and $L^{40}$ each independently represent a single bond, —$CH_2CH_2$—, —$(CH_2)_4$—, —$OCH_2$—, —$CH_2O$—, —$OCF_2$—, —$CF_2O$—, or —C≡C—, $M^{38}$ represents a 1,4-phenylene group or a trans-1,4-cyclohexylene group, $X^{32}$ represents a hydrogen atom or a fluorine atom, $p_1$ represents 0 or 1, and $Y^{34}$ represents a cyano group, a fluorine atom, a chlorine atom, a trifluoromethyl group, a fluoromethoxy group, a difluoromethoxy group, or a trifluoromethoxy group.

More specifically, structures represented by general formulae (IIIa-2a) to (IIIa-4d) below are preferable.

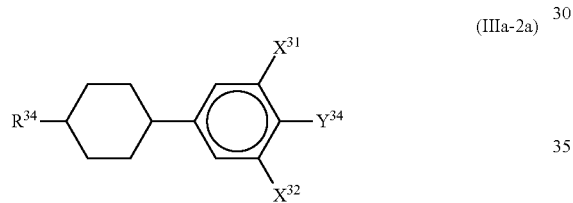
(IIIa-2a)

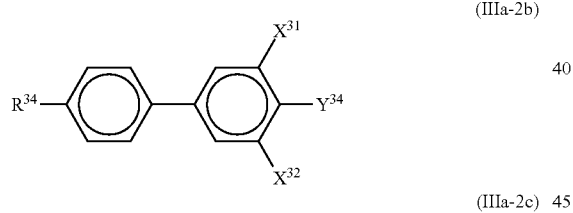
(IIIa-2b)

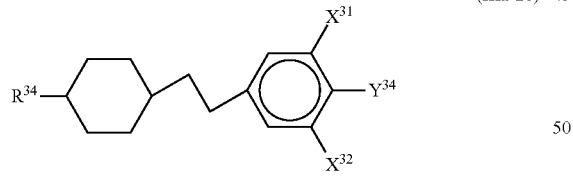
(IIIa-2c)

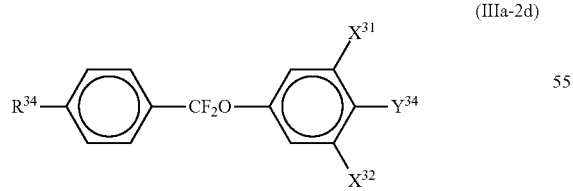
(IIIa-2d)

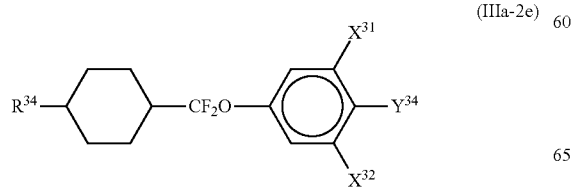
(IIIa-2e)

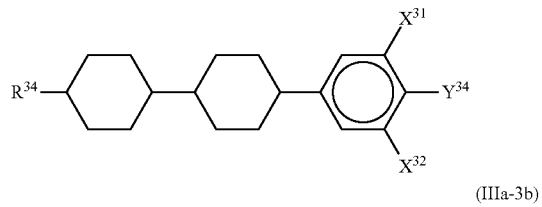
(IIIa-3a)

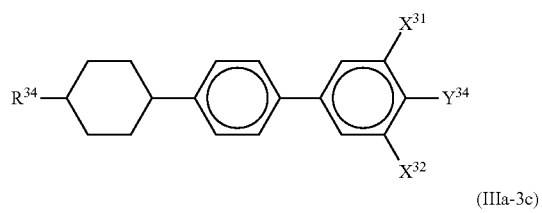
(IIIa-3b)

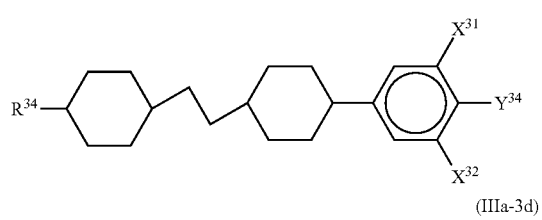
(IIIa-3c)

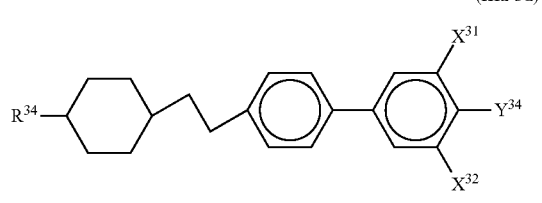
(IIIa-3d)

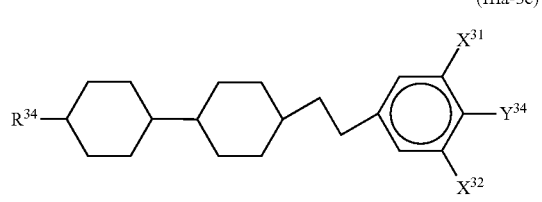
(IIIa-3e)

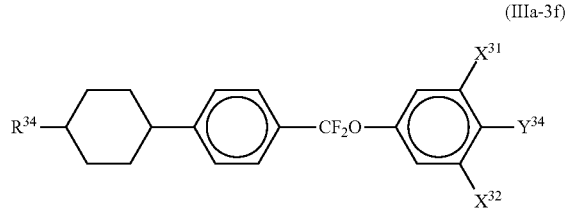
(IIIa-3f)

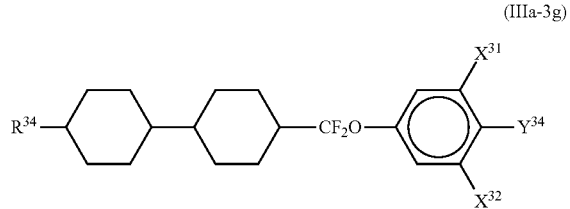
(IIIa-3g)

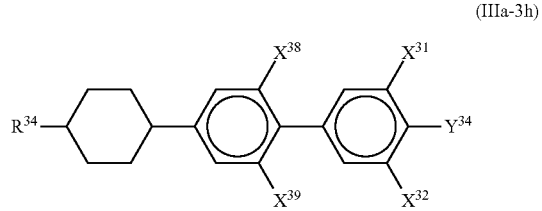
(IIIa-3h)

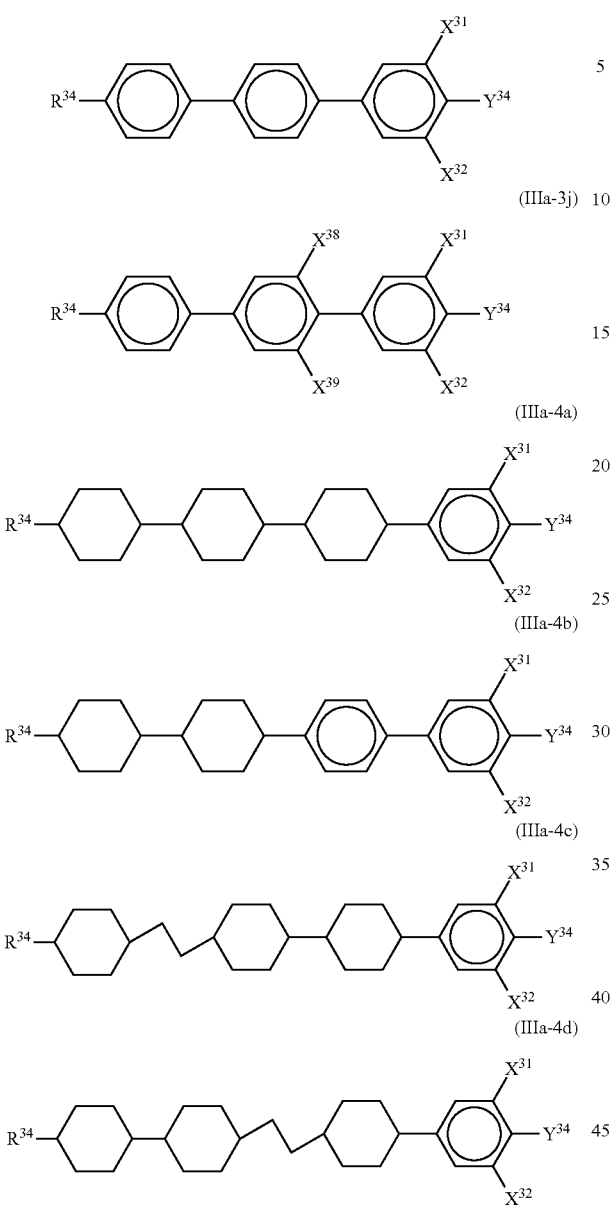

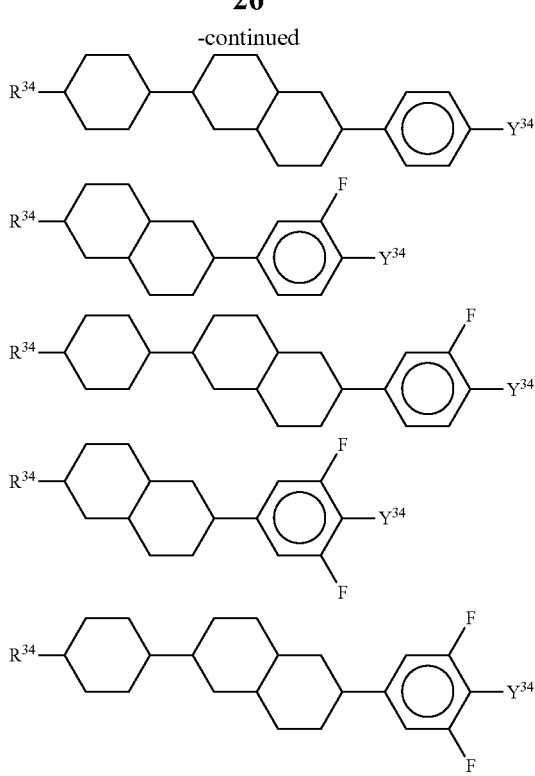

In general formulae (IIIa-2a) to (IIIa-4d), $R^{34}$ represents an alkyl group having 1 to 8 carbon atoms, an alkoxyl group having 1 to 8 carbon atoms, or an alkenyl group having 2 to 8 carbon atoms, $X^{31}$ and $X^{32}$ each independently represent a hydrogen atom or a fluorine atom, and $Y^{34}$ represents a cyano group, a fluorine atom, a chlorine atom, a trifluoromethyl group, a fluoromethoxy group, a difluoromethoxy group, or a trifluoromethoxy group.

Furthermore, structures represented by general formulae below are also preferable.

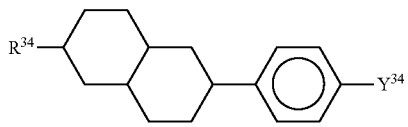

In the above formulae, $R^{34}$ represents an alkyl group having 1 to 8 carbon atoms, an alkoxyl group having 1 to 8 carbon atoms, or an alkenyl group having 2 to 8 carbon atoms, and $Y^{34}$ represents a cyano group, a fluorine atom, a chlorine atom, a trifluoromethyl group, a fluoromethoxy group, a difluoromethoxy group, or a trifluoromethoxy group.

As for general formula (IIIb), specific structures represented by general formulae below are preferable.

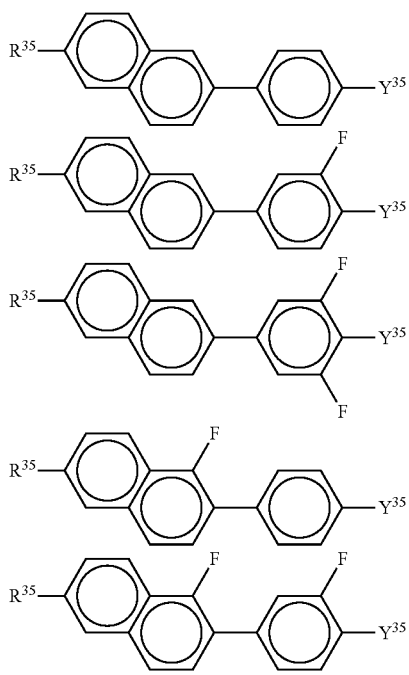

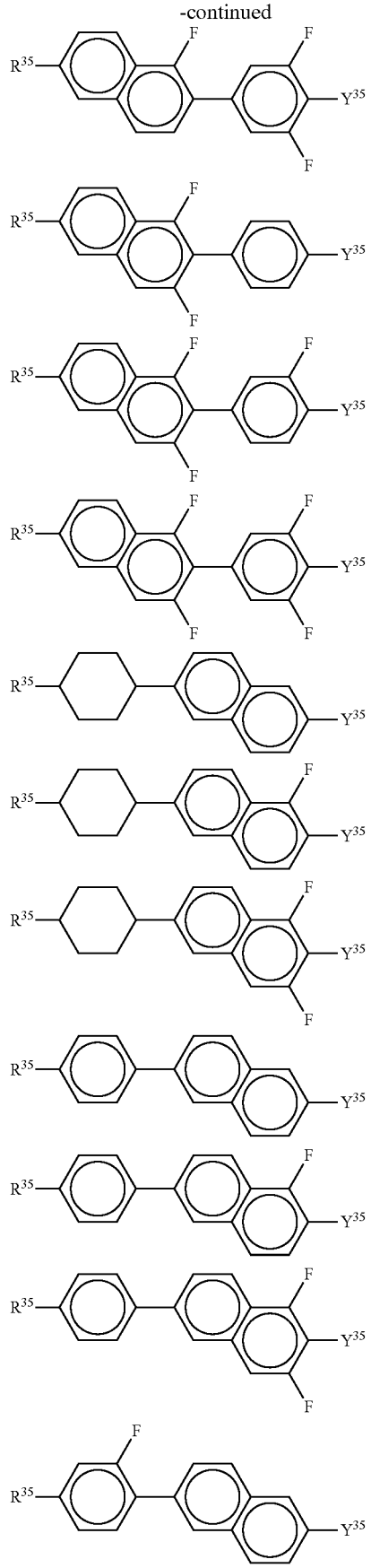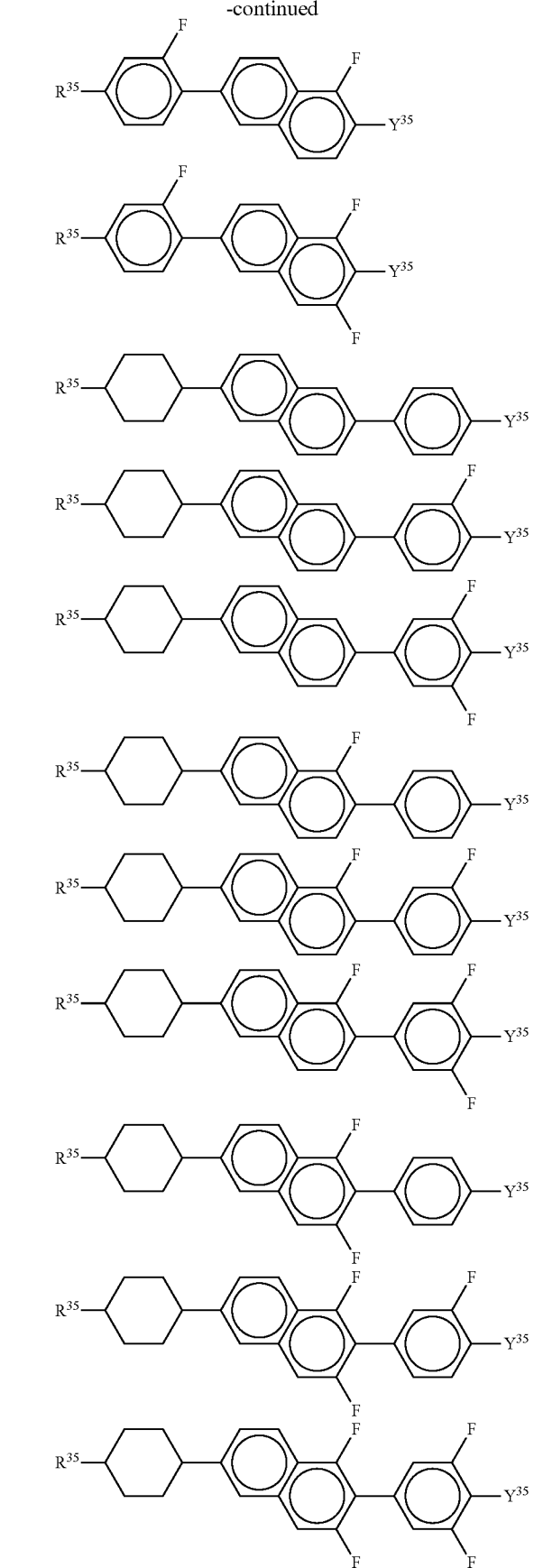

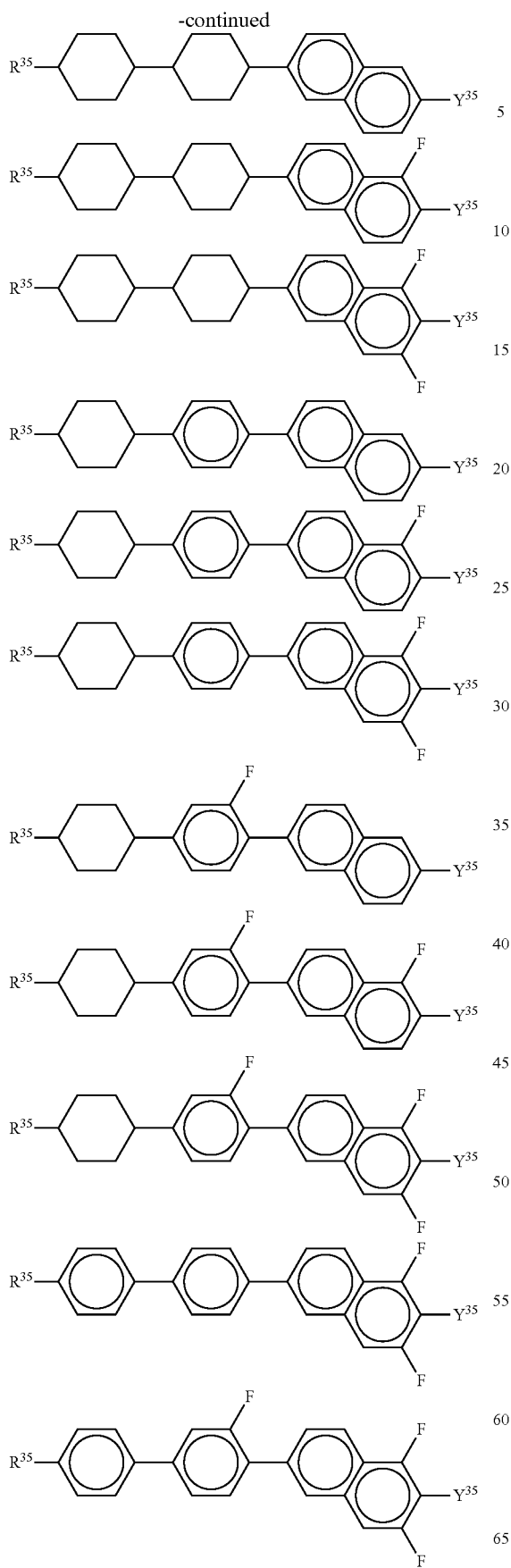
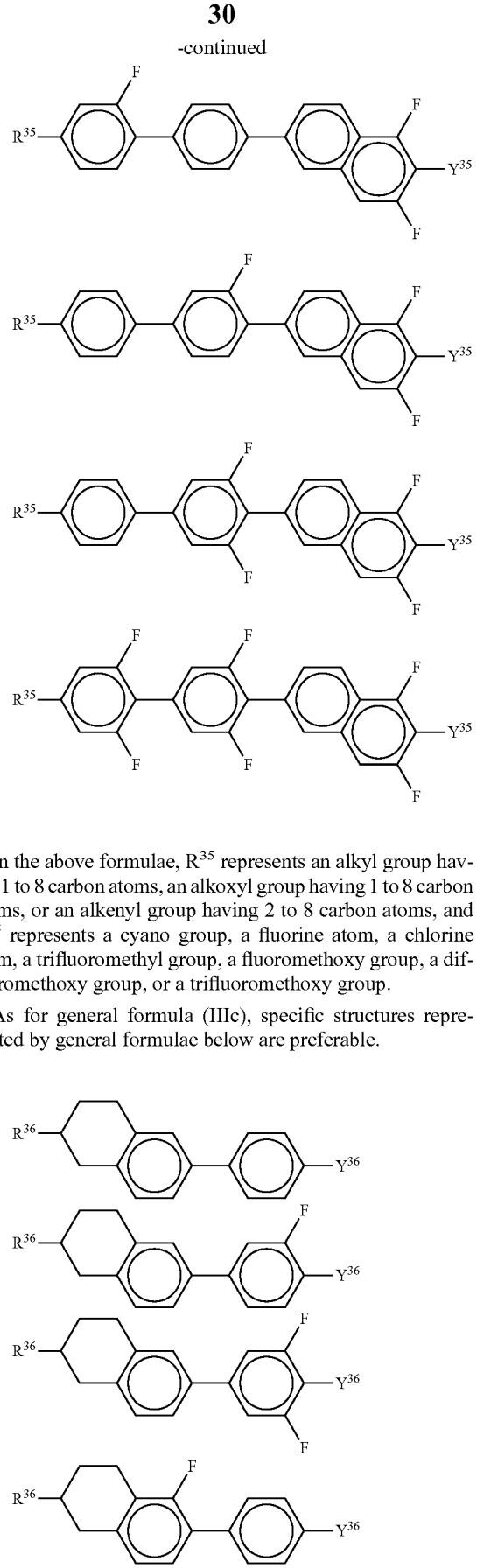

In the above formulae, $R^{35}$ represents an alkyl group having 1 to 8 carbon atoms, an alkoxyl group having 1 to 8 carbon atoms, or an alkenyl group having 2 to 8 carbon atoms, and $Y^{35}$ represents a cyano group, a fluorine atom, a chlorine atom, a trifluoromethyl group, a fluoromethoxy group, a difluoromethoxy group, or a trifluoromethoxy group.

As for general formula (IIIc), specific structures represented by general formulae below are preferable.

-continued

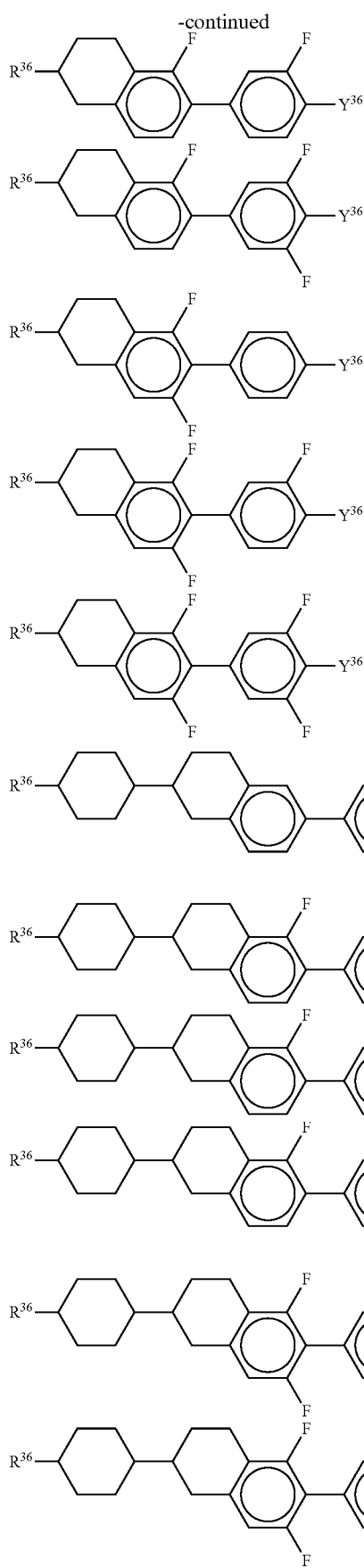

-continued

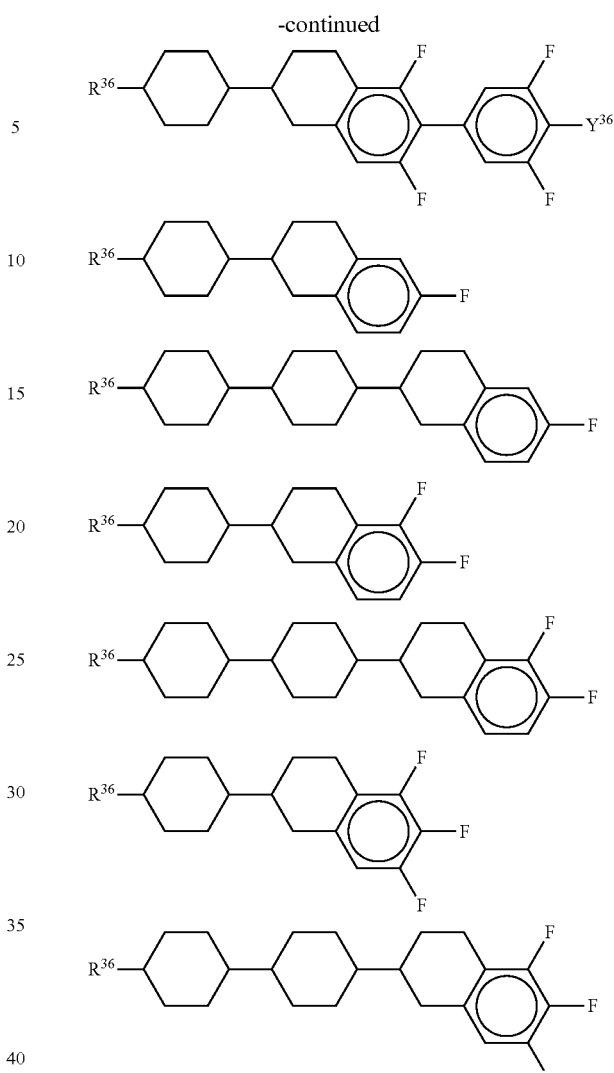

In the above formulae, $R^{36}$ represents an alkyl group having 1 to 8 carbon atoms, an alkoxyl group having 1 to 8 carbon atoms, or an alkenyl group having 2 to 8 carbon atoms, and $Y^{36}$ represents a cyano group, a fluorine atom, a chlorine atom, a trifluoromethyl group, a fluoromethoxy group, a difluoromethoxy group, or a trifluoromethoxy group.

The polymerizable-compound-containing liquid crystal composition of the present invention contains at least one compound selected from the group consisting of the compounds represented by general formulae (IIIa), (IIIb), and (IIIc). The polymerizable-compound-containing liquid crystal composition of the present invention contains preferably one to ten, and particularly preferably two to eight compounds selected from the group consisting of the compounds represented by general formulae (IIIa), (IIIb), and (IIIc). The lower limit of the content of the at least one compound selected from the group consisting of the compounds represented by general formulae (IIIa), (IIIb), and (IIIc) is preferably 5% by mass, more preferably 10% by mass, and particularly preferably 20% by mass. The upper limit of the content thereof is preferably 80% by mass, more preferably 70% by mass, still more preferably 60% by mass, and particularly preferably 50% by mass.

In the compounds represented by general formulae (IVa), (IVb), and (IVc), $R^{41}$, $R^{42}$, $R^{43}$, $R^{44}$, $R^{45}$, and $R^{46}$ are each independently preferably a linear alkyl group having 1 to 15 carbon atoms or an alkenyl group having 2 to 15 carbon atoms (where one methylene group or two or more non-adjacent methylene groups in the linear alkyl group or the alkenyl group may each be substituted with —O— or —S—, and one or more hydrogen atoms in the linear alkyl group or the alkenyl group may each be substituted with a fluorine atom or a chlorine atom), more preferably a linear alkyl group having 1 to 10 carbon atoms, a linear alkoxy group having 1 to 10 carbon atoms, or an alkenyl group having 2 to 10 carbon atoms, and particularly preferably a linear alkyl group having 1 to 8 carbon atoms or an alkoxy group having 1 to 8 carbon atoms. $M^{41}$, $M^{42}$, $M^{43}$, $M^{44}$, $M^{45}$, $M^{46}$, $M^{47}$, $M^{48}$, and $M^{49}$ are each independently preferably a trans-1,4-cyclohexylene group (where one methylene group or two or more non-adjacent methylene groups in this trans-1,4-cyclohexylene group may each be substituted with —O— or —S—), a 1,4-phenylene group (where one —CH= group or two or more non-adjacent —CH= groups in this 1,4-phenylene group may each be substituted with —N=), a 1,4-cyclohexenylene group, a 1,4-bicyclo(2.2.2)octylene group, a piperidine-2,5-diyl group, a naphthalene-2,6-diyl group, a 1,2,3,4-tetrahydronaphthalene-2,6-diyl group, or a decahydronaphthalene-2,6-diyl group (where a hydrogen atom contained in any of these groups may be substituted with a cyano group, a fluorine atom, a trifluoromethyl group, a trifluoromethoxy group, or a chlorine atom). Among these, a trans-1,4-cyclohexylene group, a 1,4-phenylene group, a 3-fluoro-1,4-phenylene group, or a 2,3-difluoro-1,4-phenylene group is more preferable, a trans-1,4-cyclohexylene group or a 1,4-phenylene group is still more preferable, and a trans-1,4-cyclohexylene group is particularly preferable. $L^{41}$, $L^{42}$, $L^{43}$, $L^{44}$, $L^{45}$, $L^{46}$, $L^{47}$, $L^{48}$, and $L^{49}$ are each independently preferably a single bond, —CH$_2$CH$_2$—, —(CH$_2$)$_4$—, —OCO—, —COO—, —OCH$_2$—, —CH$_2$O—, —OCF$_2$—, —CF$_2$O—, or —C≡C—. Among these, a single bond, —CH$_2$CH$_2$—, —OCH$_2$—, or —CH$_2$O— is more preferable. $X^{41}$, $X^{42}$, $X^{43}$, $X^{44}$, $X^{45}$, $X^{46}$, $X^{47}$ and $X^{48}$ each independently represent a hydrogen atom or a fluorine atom. G represents a methylene group or —O—. The values of u, v, w, x, y, and z are each independently 0, 1, or 2, but the values of u+v, w+x, and y+z each represent 2 or less.

Specifically, the compound represented by general formula (IVa) preferably represents the structure represented by general formula (IVa-1):

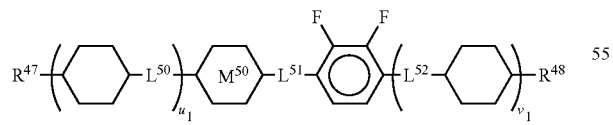

(IVa-1)

wherein $R^{47}$ and $R^{48}$ each independently represent an alkyl group having 1 to 8 carbon atoms, an alkoxyl group having 1 to 8 carbon atoms, or an alkenyl group having 2 to 8 carbon atoms, $L^{50}$, $L^{51}$, and $L^{52}$ each independently represent a single bond, —CH$_2$CH$_2$—, —(CH$_2$)$_4$—, —OCH$_2$—, —CH$_2$O—, —OCF$_2$—, —CF$_2$O—, or —C≡C—, $M^{50}$ represents a 1,4-phenylene group or a trans-1,4-cyclohexylene group, and $u_1$ and $v_1$ each independently represent 0 or 1.

More specifically, structures represented by general formulae (IVa-2a) to (IVa-31) below are preferable.

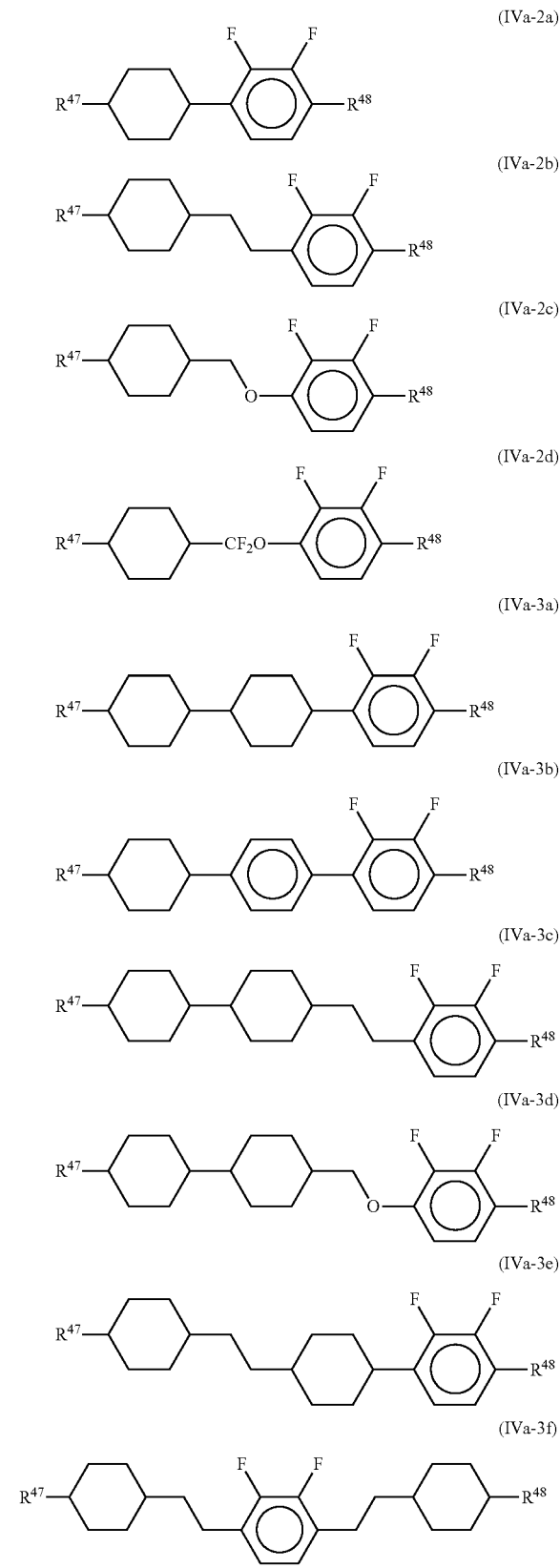

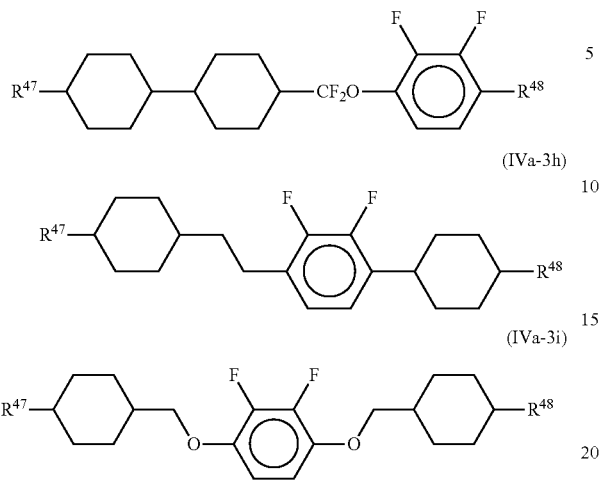

In general formulae (IVa-2a) to (IVa-3l), $R^{47}$ and $R^{48}$ each independently represent an alkyl group having 1 to 8 carbon atoms, an alkoxyl group having 1 to 8 carbon atoms, or an alkenyl group having 2 to 8 carbon atoms. More preferably, $R^{47}$ and $R^{48}$ each independently represent an alkyl group having 1 to 8 carbon atoms or an alkoxyl group having 1 to 8 carbon atoms.

Specifically, the compound represented by general formula (IVb) preferably represents the structure represented by general formula (IVb-1):

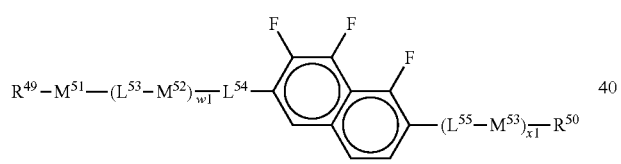

(IVb-1)

wherein $R^{49}$ and $R^{50}$ each independently represent an alkyl group having 1 to 8 carbon atoms, an alkoxyl group having 1 to 8 carbon atoms, or an alkenyl group having 2 to 8 carbon atoms, $L^{53}$, $L^{54}$, and $L^{55}$ each independently represent a single bond, —CH$_2$CH$_2$—, —(CH$_2$)$_4$—, —OCH$_2$—, —CH$_2$O—, —OCF$_2$—, —CF$_2$O—, or —C≡C—, $M^{51}$, $M^{52}$, and $M^{53}$ each represent a 1,4-phenylene group or a trans-1,4-cyclohexylene group, and the values of $w_1$ and $x_1$ each independently represent 0, 1, or 2 but the value of $w_1+x_1$ represents 2 or less.

More specifically, structures represented by general formulae (IVb-2a) to (IVb-3f) below are preferable.

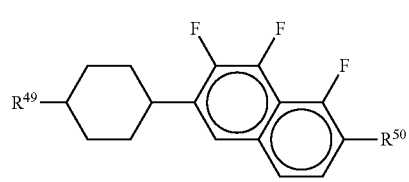

(IVb-2a)

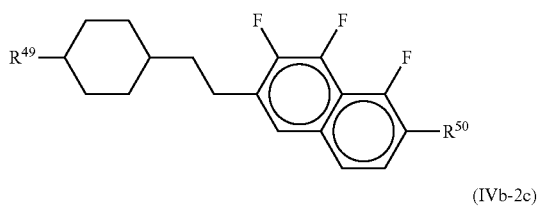

(IVb-2b)

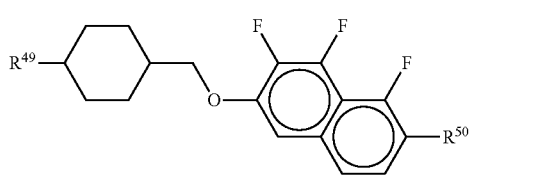

(IVb-2c)

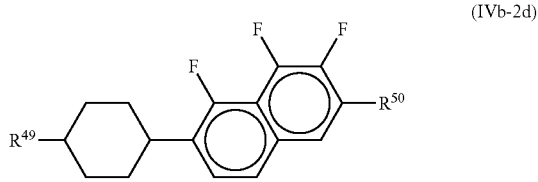

(IVb-2d)

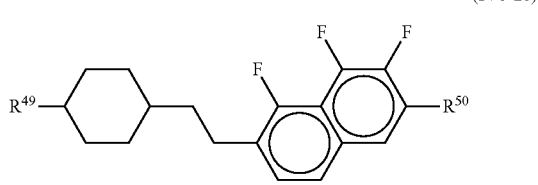

(IVb-2e)

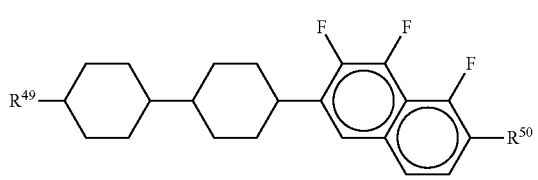

(IVb-3a)

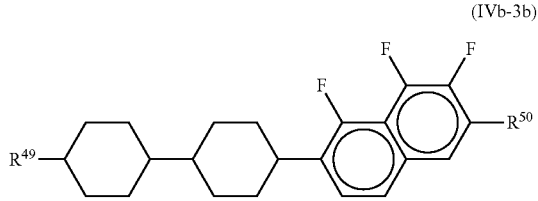

(IVb-3b)

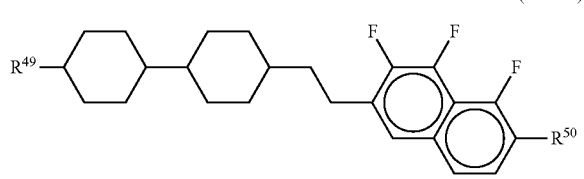

(IVb-3c)

(IVb-3d)

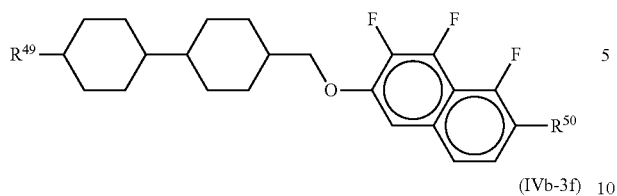
(IVb-3e)

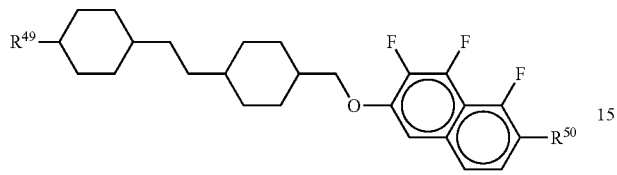
(IVb-3f)

In general formulae (IVb-2a) to (IVb-3f), $R^{49}$ and $R^{50}$ each independently represent an alkyl group having 1 to 8 carbon atoms, an alkoxyl group having 1 to 8 carbon atoms, or an alkenyl group having 2 to 8 carbon atoms.

Specifically, the compound represented by general formula (IVc) preferably represents the structures represented by general formulae (IVc-1a) and (IVc-1b):

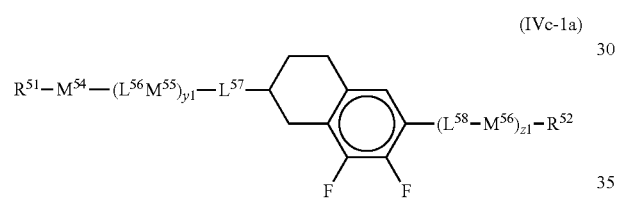
(IVc-1a)

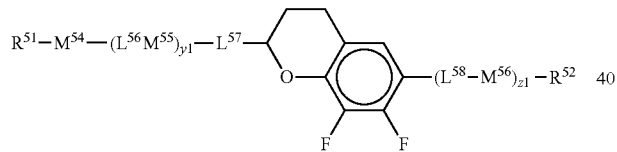
(IVc-1b)

wherein $R^{51}$ and $R^{52}$ each independently represent an alkyl group having 1 to 8 carbon atoms, an alkoxyl group having 1 to 8 carbon atoms, or an alkenyl group having 2 to 8 carbon atoms, $L^{56}$, $L^{57}$, and $L^{58}$ each independently represent a single bond, —CH$_2$CH$_2$—, —(CH$_2$)$_4$—, —OCH$_2$—, —CH$_2$O—, —OCF$_2$—, —CF$_2$O—, or —C≡C—, $M^{54}$, $M^{55}$, and $M^{56}$ each represent a 1,4-phenylene group or a trans-1,4-cyclohexylene group, and the values of $y_1$ and $z_1$ each independently represent 0, 1, or 2 but the value of $y_1+z_1$ represents 2 or less.

More specifically, structures represented by general formulae (IVc-2a) to (IVc-2g) below are preferable.

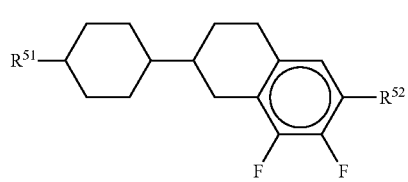
(IVc-2a)

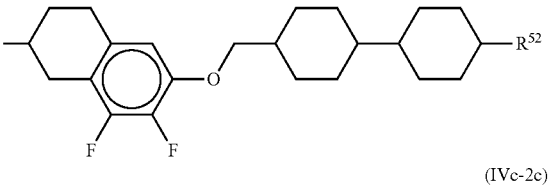
(IVc-2b)

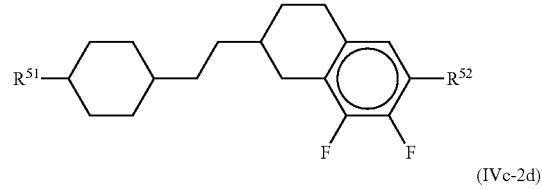
(IVc-2c)

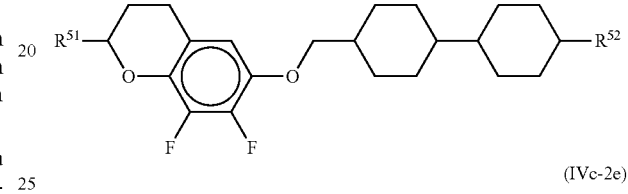
(IVc-2d)

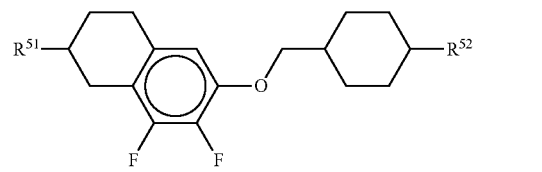
(IVc-2e)

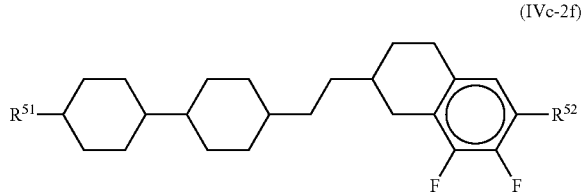
(IVc-2f)

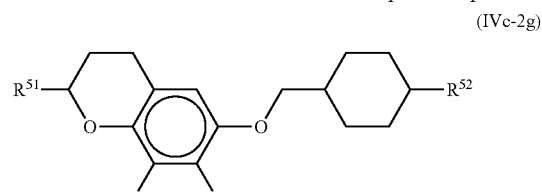
(IVc-2g)

In general formulae (IVc-2a) to (IVc-2g), $R^{51}$ and $R^{52}$ each independently represent an alkyl group having 1 to 8 carbon atoms, an alkoxyl group having 1 to 8 carbon atoms, or an alkenyl group having 2 to 8 carbon atoms.

The polymerizable-compound-containing liquid crystal composition of the present invention contains at least one compound selected from the group consisting of the compounds represented by general formulae (IIIa), (IIIb), and (IIIc) or at least one compound selected from the group consisting of the compounds represented by general formulae (IVa), (IVb), and (IVc), these compounds being used as the third component. The liquid crystal composition of the present invention contains preferably two to ten, and particularly preferably two to eight compounds selected from the group consisting of the compounds represented by general formulae (IIIa), (IIIb), and (IIIc) or the compounds represented by general formulae (IVa), (IVb), and (IVc). The lower limit of the content of the at least one compound selected from the group consisting of the compounds represented by general formulae (IIIa), (IIIb), and (IIIc) or the compounds represented by general formulae (IVa), (IVb), and (IVc) is preferably 5% by mass, more preferably 10% by mass, and particularly preferably 20% by mass. The upper limit of the content thereof is preferably 80% by mass, more preferably 70% by mass, still more preferably 60% by mass, and particularly preferably 50% by mass.

In the liquid crystal composition of the present invention, a birefringence Δn is preferably in the range of 0.08 to 0.25.

In the liquid crystal composition of the present invention, a liquid crystal composition having a positive dielectric anisotropy Δ∈ or a negative dielectric anisotropy Δ∈ may be appropriately selected and used depending on the display mode of a liquid crystal display element. In a liquid crystal display element of the multi-domain vertical alignment (MVA) mode, a liquid crystal composition having a negative dielectric anisotropy Δ∈ is used. In such a case, the dielectric anisotropy Δ∈ is preferably −1 or less, and more preferably −2 or less.

The liquid crystal composition of the present invention has a wide liquid crystal phase temperature range (i.e., the absolute value of the difference between the liquid crystal phase lower limit temperature and the liquid crystal phase upper limit temperature). The liquid crystal phase temperature range is preferably 100° C. or more, and more preferably 120° C. or more. The liquid crystal phase upper limit temperature is preferably 70° C. or higher, and more preferably 80° C. or higher. Furthermore, the liquid crystal phase lower limit temperature is preferably −20° C. or lower, and more preferably −30° C. or lower.

The liquid crystal composition of the present invention may contain a commonly used nematic liquid crystal, smectic liquid crystal, cholesteric liquid crystal, or the like besides the compounds described above.

According to the polymerizable-compound-containing liquid crystal composition of the present invention, polymerization proceeds even when no polymerization initiator is present. However, the liquid crystal composition of the present invention may contain a polymerization initiator in order to accelerate the polymerization. Examples of the polymerization initiator include benzoin ethers, benzophenones, acetophenones, benzyl ketals, and acylphosphine oxides.

In order to improve the storage stability of the liquid crystal composition of the present invention, a stabilizer may be added to the liquid crystal composition. Examples of the stabilizer that can be used include hydroquinones, hydroquinone monoalkyl ethers, tertiary butyl catechols, pyrogallols, thiophenols, nitro compounds, β-naphthylamines, β-naphthols, and nitroso compounds. When the stabilizer is used, the amount of stabilizer added is preferably in the range of 0.005% to 1% by mass, more preferably 0.02% to 0.5% by mass, and particularly preferably 0.03% to 0.1% by mass relative to the liquid crystal compound.

To the liquid crystal composition of the present invention, a liquid crystal alignment capability is provided by polymerization of the polymerizable compound contained in the liquid crystal composition. The liquid crystal composition of the present invention is used in a liquid crystal display element in which the amount of transmitted light is controlled by using the birefringence of the liquid crystal composition. The liquid crystal composition of the present invention can be useful for various liquid crystal display elements, such as an active-matrix liquid crystal display element (AM-LCD), a twisted nematic liquid crystal display element (TN-LCD), a super twisted nematic liquid crystal display element (STN-LCD), an optically compensated birefringence liquid crystal display element (OCB-LCD), and an in-plane-switching liquid crystal display element (IPS-LCD). The liquid crystal composition of the present invention is particularly useful for an AM-LCD, and can be used in a transmissive or reflective liquid crystal display element.

Two substrates of a liquid crystal cell used in a liquid crystal display element may be composed of glass or a flexible transparent material such as a plastic material. One of the substrates may be composed of an opaque material such as silicon. A transparent substrate having a transparent electrode layer can be produced by, for example, sputtering indium tin oxide (ITO) on a transparent substrate such as a glass plate.

A color filter can be produced by, for example, a pigment dispersion method, a printing method, an electrodeposition method, or a staining method. A method for producing a color filter will be described by taking the pigment dispersion method as an example. First, a curable coloring composition for a color filter is applied onto the above-mentioned transparent substrate, and is then patterned. The curable coloring composition is then cured by heat or light irradiation. These steps are performed for each of three colors of red, green, and blue. Thus, pixel portions of the color filter can be formed. Furthermore, pixel electrodes each including an active element such as a TFT, a thin-film diode, or a metal-insulator-metal specific resistance element may be provided on the substrate.

The substrates are arranged so as to face each other such that the transparent electrode layer is disposed inside. In this step, the gap between the substrates may be adjusted with a spacer therebetween. In this case, the gap is preferably adjusted so that the thickness of a light-modulating layer obtained is in the range of 1 to 100 μm, and more preferably 1.5 to 10 μm. When a polarizer is used, it is preferable to adjust the product (Δn×d) of the birefringence Δn of liquid crystals and a cell thickness d so that the maximum contrast is obtained. When two polarizers are provided, the adjustment may also be performed so that a satisfactory angle of view and contrast can be obtained by adjusting the polarizing axis of each of the polarizers. Furthermore, a retardation film for widening the angle of view may also be used. Examples of the spacer include glass particles, plastic particles, alumina particles, and a photoresist material. Subsequently, a sealant such as an epoxy thermosetting composition or the like is applied onto the substrate by screen printing so as to form a liquid-crystal injection port. The substrates are then bonded to each other, and the sealant is thermally cured by heating.

As a method for interposing the liquid crystal composition between the two substrates, a commonly used vacuum injection method, a one-drop-fill (ODF) method, or the like can be employed.

As a method for polymerizing the polymerizable compound, a method in which polymerization is conducted by applying an active energy ray such as ultraviolet light or an electron beam is preferable because rapid progress of polymerization is desirable. In the case where ultraviolet light is used, either a polarized light source or an unpolarized light source may be used. When polymerization is conducted in a state in which the liquid crystal composition is interposed between two substrates, it is necessary that at least a substrate disposed on the irradiation surface side have transparency appropriate for the active energy ray. Also, specific portions may be polymerized using a mask during light irradiation, and unpolymerized potions may then be polymerized by further applying an active energy ray while changing the alignment state of the unpolymerized potions by changing a condition such as the electric field, the magnetic field, the temperature, or the like. In particular, when ultraviolet exposure is performed, the ultraviolet exposure is preferably performed while applying an alternating current to the polymerizable-compound-containing liquid crystal composition. The alternating current applied is preferably an alternating current having a frequency of 10 Hz to 10 kHz, and more preferably 60 Hz to 10 kHz, and the voltage applied is selected in accordance with a desired pretilt angle of the liquid crystal display element. That is, the pretilt angle of the liquid crystal display element can be controlled by the voltage applied. In a liquid crystal display element of the MVA mode, it is preferable to control the pretilt angle to 80 to 89 degrees from the standpoint of alignment stability and the contrast.

The temperature during the irradiation is preferably within a temperature range in which the liquid crystal state of the liquid crystal composition of the present invention is maintained. Polymerization is preferably conducted at a temperature close to room temperature, that is, typically at a temperature in the range of 15° C. to 35° C. A metal halide lamp, a high-pressure mercury lamp, an ultrahigh-pressure mercury lamp, or the like can be used as a lamp for generating ultraviolet light. As for the wavelength of ultraviolet light irradiated, it is preferable to irradiate ultraviolet light in a wavelength range which is not included in an absorption wavelength range of the liquid crystal composition. Preferably, part of light is cut off and used, as required. The intensity of ultraviolet light irradiated is preferably 0.1 mW/cm² to 100 W/cm², and more preferably 2 mW/cm² to 50 W/cm². The amount of energy of the ultraviolet light irradiated can be appropriately adjusted, but is preferably 10 to 80,000 mJ/cm², and more preferably 100 to 10,000 mJ/cm². During the irradiation of ultraviolet light, the intensity of the ultraviolet light may be changed. The ultraviolet-irradiation time is appropriately selected in accordance with the intensity of the ultraviolet light irradiated, but is preferably 10 to 600 seconds.

EXAMPLES

The present invention will be described in more detail by way of Examples, but the present invention is not limited to these Examples. It should be noted that "%" in compositions of Examples and Comparative Examples described below represents "% by mass" unless otherwise stated.

Physical properties of liquid crystal compositions are represented as follows:

$T_{N-I}$: The nematic phase-isotropic liquid phase transition temperature (° C.) was defined as the liquid crystal phase upper limit temperature.

$\Delta\epsilon$: dielectric anisotropy $\Delta n$: birefringence $V_{th}$: An applied voltage with which the transmittance is changed by 10% when a square wave with a frequency of 1 kHz is applied (threshold vltage)

A liquid crystal composition was injected into a liquid crystal cell, and the cell was then irradiated with ultraviolet (UV) light to polymerize a polymerizable compound. Subsequently, the liquid crystal cell was disassembled to prepare an acetonitrile solution of an elution component containing a liquid crystal material, a polymerized product, and an unpolymerized polymerizable compound. This solution was analyzed by high-performance liquid chromatography (column: reverse-phase column, developing solvent: acetonitrile) to measure the peak area of each component. The amount of residual polymerizable compound was determined from the ratio of the peak area of the unpolymerized polymerizable compound to the peak area of the liquid crystal material used as an indicator. The amount of residual monomer was determined from this value and the amount of polymerizable compound initially added. The detection limit of the amount of residual polymerizable compound was 1,000 ppm.

Example 1

A liquid crystal composition LC-1 containing at least one compound selected from the compounds represented by general formula (II) and at least one compound selected from the compounds represented by general formulae (IIIa), (IIIb), and (IIIc) or at least one compound selected from the compounds represented by general formulae (IVa), (IVb), and (IVc) was prepared. The compounds constituting the liquid crystal composition LC-1 and the proportions of the compounds are as follows.

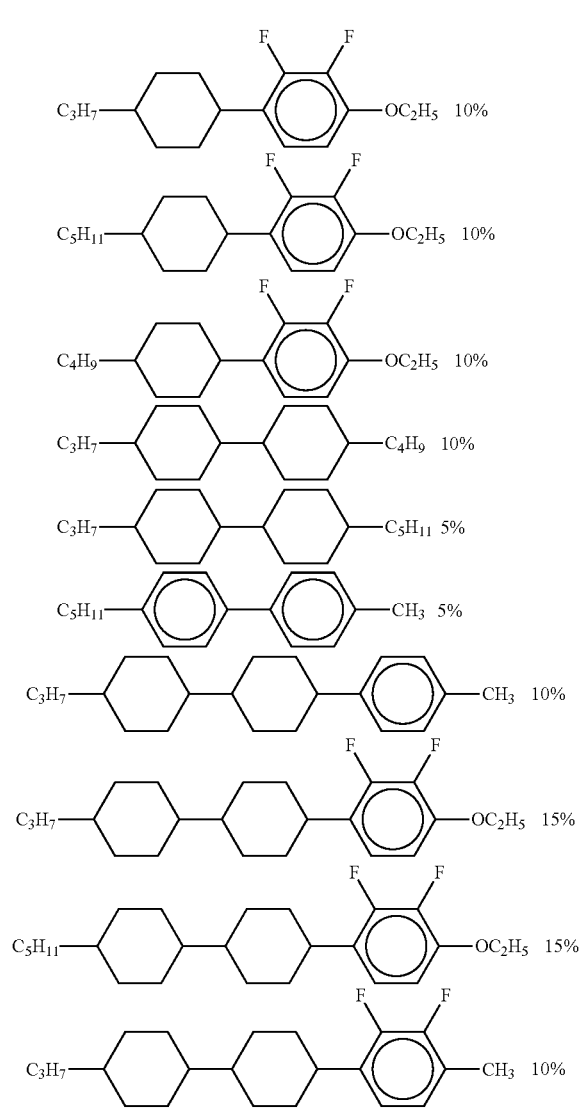

Table 1 shows the physical properties of the liquid crystal composition LC-1.

TABLE 1

| | |
|---|---|
| $T_{N-I}$ (° C.) | 80 |
| $\Delta\epsilon$ | −3.5 |
| $\Delta n$ | 0.087 |

A polymerizable liquid crystal composition CLC-1 was prepared by adding 0.3% of a polymerizable compound represented by formula (I-3-a) below to 99.7% of the liquid crystal composition LC-1 and uniformly dissolving the polymerizable compound.

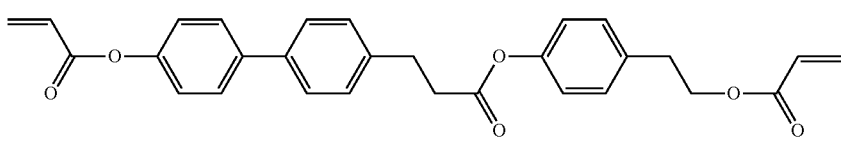

(I-3-a)

The physical properties of the polymerizable liquid crystal composition CLC-1 were substantially the same as those of the liquid crystal composition LC-1. Thus, it was confirmed that the compound represented by formula (I-3-a) does not degrade the liquid crystal properties of the liquid crystal composition added thereto. This polymerizable liquid crystal composition CLC-1 was stored in a cold place (at −20° C.) for one week. Consequently, deposition and the like did not occur. Thus, it was found that the polymerizable compound represented by formula (I-3-a) had a good compatibility with other liquid crystal compounds.

The polymerizable liquid crystal composition CLC-1 was injected, by a vacuum injection method, into a cell having an ITO electrode layer, the cell having a cell gap of 3.5 μm and including polyimide alignment layers that induce a homeotropic alignment. The pretilt angle of this cell was measured (by a crystal rotation method), and the liquid crystal cell was then irradiated with ultraviolet light using a high-pressure mercury lamp through a filter that cut ultraviolet light of 320 nm or less while applying a square wave of 1.8 V at a frequency of 1 kHz. The irradiation intensity on the surface of the cell was adjusted to 15 mW/cm², and the irradiation was performed for 600 seconds, thus fabricating a homeotropic-alignment liquid crystal display element in which the polymerizable compound in the polymerizable liquid crystal composition CLC-1 was polymerized. Table 2 shows the pretilt angles of the element measured before and after the ultraviolet irradiation and an electro-optic property of the element.

TABLE 2

| | |
|---|---|
| Pretilt angle before ultraviolet irradiation | 89.6 |
| Pretilt angle after ultraviolet irradiation | 86.8 |
| $V_{th}$ (V) | 2.43 |

The above results of the pretilt angles show that an alignment control force acting on liquid crystal compounds was generated by polymerizing the polymerizable compound and a homeotropic-alignment liquid crystal display element was obtained in which the pretilt angle was fixed in a state where liquid crystal molecules were tilted at 2.8 degrees with respect to the vertical direction.

Furthermore, the content of the unpolymerized compound represented by formula (I-3-a) in the element was analyzed by liquid chromatography, but the unpolymerized compound was not detected. Thus, it was confirmed that the polymerizable compound represented by formula (I-3-a) could be polymerized without using a polymerization initiator, and that the content of the unpolymerized product remaining after the polymerization was equal to or less than the detection limit.

Comparative Example 1

A polymerizable liquid crystal composition CLC-A was prepared by adding 0.3% of a polymerizable compound represented by formula (A) to 99.7% of the liquid crystal composition LC-1 and uniformly dissolving the polymerizable compound.

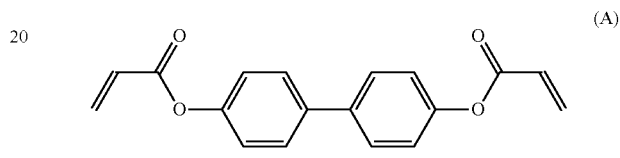

(A)

The polymerizable liquid crystal composition CLC-A was injected, by a vacuum injection method, into a cell having an ITO electrode layer, the cell having a cell gap of 3.5 μm and including polyimide alignment layers that induce a homeotropic alignment. The pretilt angle of this cell was measured, and the liquid crystal cell was then irradiated with ultraviolet light using a high-pressure mercury lamp through a filter that cut ultraviolet light of 320 nm or less while applying a square wave of 1.8 V at a frequency of 1 kHz. The irradiation intensity on the surface of the cell was adjusted to 15 mW/cm², and the irradiation was performed for 600 seconds, thus fabricating a homeotropic-alignment liquid crystal display element in which the polymerizable compound in the polymerizable liquid crystal composition CLC-A was polymerized. The pretilt angle after the ultraviolet irradiation of the element was 87.4 degrees whereas the pretilt angle before the ultraviolet irradiation was 89.6 degrees. Thus, the pretilt angle was fixed in a state in which the liquid crystal molecules were tilted with respect to the vertical direction. However, according to the analytical result of the content of the unpolymerized compound represented by formula (A) in the element, the result being obtained by liquid chromatography, the content of the unpolymerized compound was 1,200 ppm. Thus, the polymerization of the polymerizable compound (A) did not completely proceed. In addition, this polymerizable liquid crystal composition CLC-A was stored in a cold place (at −20° C.) for one week. Consequently, deposition occurred. Thus, it was found that this polymerizable compound represented by formula (A) had a poor compatibility with other liquid crystal compounds.

Example 2

A polymerizable liquid crystal composition CLC-2 was prepared by adding 0.5% of the polymerizable compound represented by formula (I-3-a) to 99.5% of the liquid crystal composition LC-1 and uniformly dissolving the polymerizable compound. It was found that the compound represented by formula (I-3-a) did not degrade the liquid crystal properties, and had a good compatibility as in Example 1. This polymerizable liquid crystal composition CLC-2 was stored in a cold place (at −20° C.) for one week. Consequently, deposition and the like did not occur. Thus, it was found that the polymerizable compound represented by formula (I-3-a) had a good compatibility with other liquid crystal compounds.

The polymerizable liquid crystal composition CLC-2 was injected, by a vacuum injection method, into a cell having an ITO electrode layer, the cell having a cell gap of 3.5 μm and including polyimide alignment layers that induce a homeotropic alignment. The pretilt angle of this cell was measured, and the liquid crystal cell was then irradiated with ultraviolet light using a high-pressure mercury lamp through a filter that cut ultraviolet light of 320 nm or less while applying a square wave of 1.8 V at a frequency of 1 kHz. The irradiation intensity on the surface of the cell was adjusted to 15 mW/cm$^2$, and the irradiation was performed for 600 seconds, thus fabricating a homeotropic-alignment liquid crystal display element in which the polymerizable compound in the polymerizable liquid crystal composition CLC-2 was polymerized. The pretilt angle after the ultraviolet irradiation of the element was 87.8 degrees whereas the pretilt angle before the ultraviolet irradiation was 89.8 degrees. Thus, the pretilt angle was fixed in a state in which the liquid crystal molecules were tilted with respect to the vertical direction. The content of the unpolymerized compound represented by formula (I-3-a) in the element was analyzed by liquid chromatography. The content of the unpolymerized compound was equal to or lower than the detection limit. Thus, it was confirmed that the polymerizable compound represented by formula (I-3-a) could be polymerized without using a polymerization initiator, and that the content of the unpolymerized product remaining after the polymerization was equal to or less than the detection limit.

Example 3

A polymerizable liquid crystal composition CLC-3 was prepared by adding 0.3% of a polymerizable compound represented by formula (I-7-a) to 99.7% of the liquid crystal composition LC-1 and uniformly dissolving the polymerizable compound.

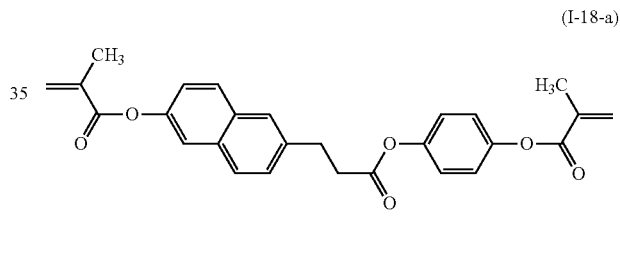

(I-7-a)

It was found that the compound represented by formula (I-7-a) did not degrade the liquid crystal properties, and had a good compatibility as in the compound represented by formula (I-3-a) and described in Example 1. This polymerizable liquid crystal composition CLC-3 was stored in a cold place (at −20° C.) for one week. Consequently, deposition and the like did not occur. Thus, it was found that the polymerizable compound represented by formula (I-7-a) had a good compatibility with other liquid crystal compounds.

The polymerizable liquid crystal composition CLC-3 was injected, by a vacuum injection method, into a cell having an ITO electrode layer, the cell having a cell gap of 3.5 μm and including polyimide alignment layers that induce a homeotropic alignment. The pretilt angle of this cell was measured, and the liquid crystal cell was then irradiated with ultraviolet light using a high-pressure mercury lamp through a filter that cut ultraviolet light of 320 nm or less while applying a square wave of 1.8 V at a frequency of 1 kHz. The irradiation intensity on the surface of the cell was adjusted to 15 mW/cm$^2$, and the irradiation was performed for 600 seconds, thus fabricating a homeotropic-alignment liquid crystal display element in which the polymerizable compound in the polymerizable liquid crystal composition CLC-3 was polymerized. The pretilt angle after the ultraviolet irradiation of the element was 87.8 degrees whereas the pretilt angle before the ultraviolet irradiation was 89.8 degrees. Thus, the pretilt angle was fixed in a state in which the liquid crystal molecules were tilted with respect to the vertical direction. The content of the unpolymerized compound represented by formula (I-7-a) in the element was analyzed by liquid chromatography. The content of the unpolymerized compound was equal to or lower than the detection limit. Thus, it was confirmed that the polymerizable compound represented by formula (I-7-a) could be polymerized without using a polymerization initiator, and that the content of the unpolymerized product remaining after the polymerization was equal to or less than the detection limit.

Example 4

A polymerizable liquid crystal composition CLC-4 was prepared by adding 0.3% of a polymerizable compound represented by formula (I-18-a) to 99.7% of the liquid crystal composition LC-1 and uniformly dissolving the polymerizable compound.

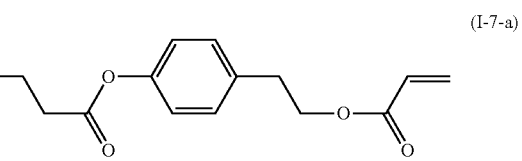

(I-18-a)

It was found that the compound represented by formula (I-18-a) did not degrade the liquid crystal properties, and had a good compatibility as in the compound represented by formula (I-3-a) and descried in Example 1. This polymerizable liquid crystal composition CLC-4 was stored in a cold place (at −20° C.) for one week. Consequently, deposition and the like did not occur. Thus, it was found that the polymerizable compound represented by formula (I-18-a) had a good compatibility with other liquid crystal compounds.

The polymerizable liquid crystal composition CLC-4 was injected, by a vacuum injection method, into a cell having an ITO electrode layer, the cell having a cell gap of 3.5 μm and including polyimide alignment layers that induce a homeotropic alignment. The pretilt angle of this cell was measured, and the liquid crystal cell was then irradiated with ultraviolet light using a high-pressure mercury lamp through a filter that cut ultraviolet light of 320 nm or less while applying a square wave of 1.8 V at a frequency of 1 kHz. The irradiation intensity on the surface of the cell was adjusted to 15 mW/cm², and the irradiation was performed for 600 seconds, thus fabricating a homeotropic-alignment liquid crystal display element in which the polymerizable compound in the polymerizable liquid crystal composition CLC-4 was polymerized. The pretilt angle after the ultraviolet irradiation of the element was 87.5 degrees whereas the pretilt angle before the ultraviolet irradiation was 89.7 degrees. Thus, the pretilt angle was fixed in a state in which the liquid crystal molecules were tilted with respect to the vertical direction. The content of the unpolymerized compound represented by formula (I-18-a) in the element was analyzed by liquid chromatography. The content of the unpolymerized compound was equal to or lower than the detection limit. Thus, it was confirmed that the polymerizable compound represented by formula (I-18-a) could be polymerized without using a polymerization initiator, and that the content of the unpolymerized product remaining after the polymerization was equal to or less than the detection limit.

Example 5

A polymerizable liquid crystal composition CLC-5 was prepared by adding 0.1% of the polymerizable compound represented by formula (I-18-a) to 99.9% of the liquid crystal composition LC-1 and uniformly dissolving the polymerizable compound. It was found that the compound represented by formula (I-18-a) did not degrade the liquid crystal properties, and had a good compatibility as in the compound represented by formula (I-3-a) and described in Example 1. This polymerizable liquid crystal composition CLC-5 was stored in a cold place (at −20° C.) for one week. Consequently, deposition and the like did not occur. Thus, it was found that the polymerizable compound represented by formula (I-18-a) had a good compatibility with other liquid crystal compounds.

The polymerizable liquid crystal composition CLC-5 was injected, by a vacuum injection method, into a cell having an ITO electrode layer, the cell having a cell gap of 3.5 μm and including polyimide alignment layers that induce a homeotropic alignment. The pretilt angle of this cell was measured, and the liquid crystal cell was then irradiated with ultraviolet light using a high-pressure mercury lamp through a filter that cut ultraviolet light of 320 nm or less while applying a square wave of 1.8 V at a frequency of 1 kHz. The irradiation intensity on the surface of the cell was adjusted to 15 mW/cm², and the irradiation was performed for 600 seconds, thus fabricating a homeotropic-alignment liquid crystal display element in which the polymerizable compound in the polymerizable liquid crystal composition CLC-5 was polymerized. The pretilt angle after the ultraviolet irradiation of the element was 87.9 degrees whereas the pretilt angle before the ultraviolet irradiation was 89.6 degrees. Thus, the pretilt angle was fixed in a state in which the liquid crystal molecules were tilted with respect to the vertical direction. The content of the unpolymerized compound represented by formula (I-18-a) in the element was analyzed by liquid chromatography. The content of the unpolymerized compound was equal to or lower than the detection limit. Thus, it was confirmed that the polymerizable compound represented by formula (I-18-a) could be polymerized without using a polymerization initiator, and that the content of the unpolymerized product remaining after the polymerization was equal to or less than the detection limit.

Example 6

A liquid crystal composition LC-2 containing the components below was prepared as a sample containing at least one compound selected from the compounds represented by general formula (II) and at least one compound selected from the compounds represented by general formulae (IIIa), (IIIb), and (IIIc) or at least one compound selected from the compounds represented by general formulae (IVa), (IVb), and (IVc).

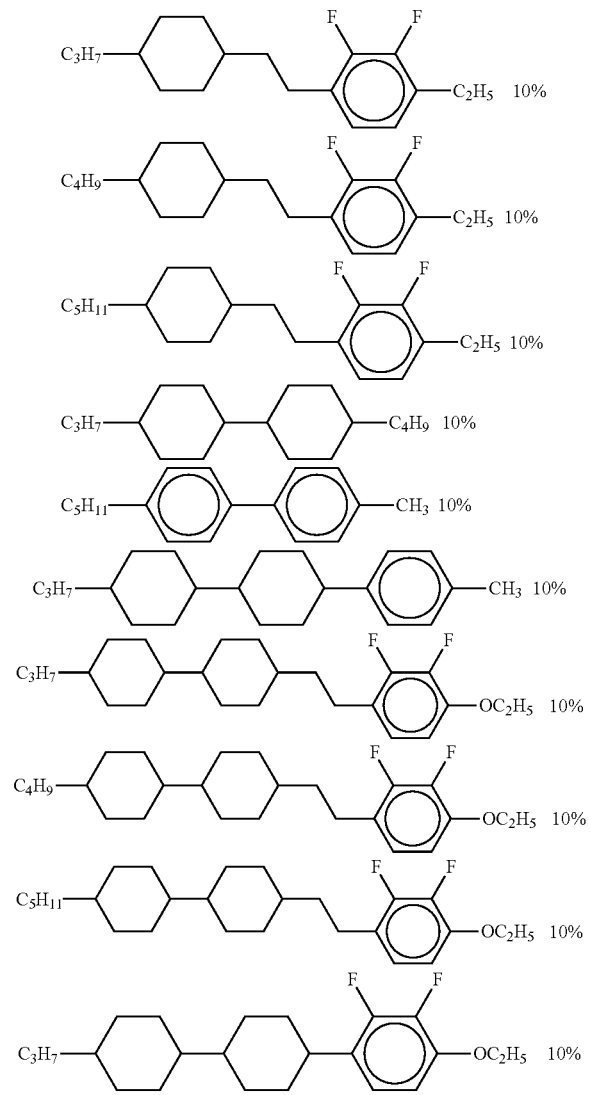

Table 3 shows the physical properties of the liquid crystal composition LC-2.

TABLE 3

| $T_{N-I}$ (° C.) | 85 |
|---|---|
| Δε | −3.4 |
| Δn | 0.094 |

A polymerizable liquid crystal composition CLC-6 was prepared by adding 0.3% of the polymerizable compound represented by formula (I-3-a) to 99.7% of the liquid crystal composition LC-2 and uniformly dissolving the polymerizable compound. It was found that the compound represented by formula (I-3-a) did not degrade the liquid crystal properties, and had a good compatibility as in Example 1. This polymerizable liquid crystal composition CLC-6 was stored in a cold place (at −20° C.) for one week. Consequently, deposition and the like did not occur. Thus, it was found that the polymerizable compound represented by formula (I-3-a) had a good compatibility with other liquid crystal compounds.

The polymerizable liquid crystal composition CLC-6 was injected, by a vacuum injection method, into a cell having an ITO electrode layer, the cell having a cell gap of 3.5 μm and including polyimide alignment layers that induce a homeotropic alignment. The pretilt angle of this cell was measured, and the liquid crystal cell was then irradiated with ultraviolet light using a high-pressure mercury lamp through a filter that cut ultraviolet light of 320 nm or less while applying a square wave of 1.8 V at a frequency of 1 kHz. The irradiation intensity on the surface of the cell was adjusted to 15 mW/cm², and the irradiation was performed for 600 seconds, thus fabricating a homeotropic-alignment liquid crystal display element in which the polymerizable compound in the polymerizable liquid crystal composition CLC-6 was polymerized. The pretilt angle after the ultraviolet irradiation of the element was 87.1 degrees whereas the pretilt angle before the ultraviolet irradiation was 89.7 degrees. Thus, the pretilt angle was fixed in a state in which the liquid crystal molecules were tilted with respect to the vertical direction. The content of the unpolymerized compound represented by formula (I-3-a) in the element was analyzed by liquid chromatography. The content of the unpolymerized compound was equal to or lower than the detection limit. Thus, it was confirmed that the polymerizable compound represented by formula (I-3-a) could be polymerized without using a polymerization initiator, and that the content of the unpolymerized product remaining after the polymerization was equal to or less than the detection limit.

Example 7

A liquid crystal composition LC-3 containing the components below was prepared as a sample containing at least one compound selected from the compounds represented by general formula (II) and at least one compound selected from the compounds represented by general formulae (IIIa), (IIIb), and (IIIc) or at least one compound selected from the compounds represented by general formulae (IVa), (IVb), and (IVc).

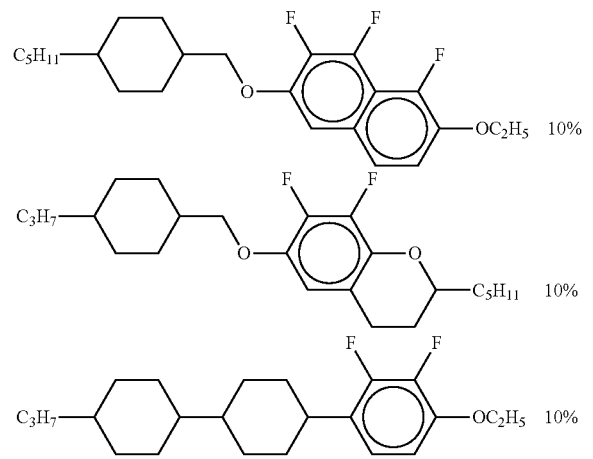

-continued

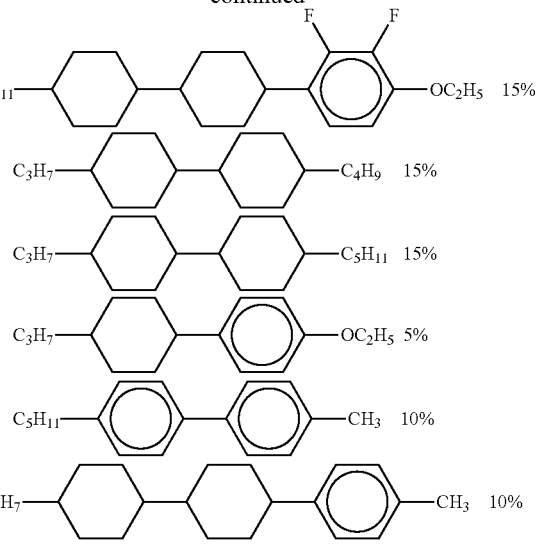

Table 4 shows the physical properties of the liquid crystal composition LC-3.

TABLE 4

| $T_{N-I}$ (° C.) | 72 |
|---|---|
| Δε | −3.3 |
| Δn | 0.086 |

A polymerizable liquid crystal composition CLC-7 was prepared by adding 0.3% of the polymerizable compound represented by formula (I-3-a) to 99.7% of the liquid crystal composition LC-3 and uniformly dissolving the polymerizable compound. It was found that the compound represented by formula (I-3-a) did not degrade the liquid crystal properties, and had a good compatibility as in Example 1. This polymerizable liquid crystal composition CLC-7 was stored in a cold place (at −20° C.) for one week. Consequently, deposition and the like did not occur. Thus, it was found that the polymerizable compound represented by formula (I-3-a) had a good compatibility with other liquid crystal compounds.

The polymerizable liquid crystal composition CLC-7 was injected, by a vacuum injection method, into a cell having an ITO electrode layer, the cell having a cell gap of 3.5 μm and including polyimide alignment layers that induce a homeotropic alignment. The pretilt angle of this cell was measured, and the liquid crystal cell was then irradiated with ultraviolet light using a high-pressure mercury lamp through a filter that cut ultraviolet light of 320 nm or less while applying a square wave of 1.8 V at a frequency of 1 kHz. The irradiation intensity on the surface of the cell was adjusted to 15 mW/cm², and the irradiation was performed for 600 seconds, thus fabricating a homeotropic-alignment liquid crystal display element in which the polymerizable compound in the polymerizable liquid crystal composition CLC-7 was polymerized. The pretilt angle after the ultraviolet irradiation of the element was 86.8 degrees whereas the pretilt angle before the ultraviolet irradiation was 89.7 degrees. Thus, the pretilt angle was fixed in a state in which the liquid crystal molecules were tilted with respect to the vertical direction. The content of the unpolymerized compound represented by formula (I-3-a) in the element was analyzed by liquid chromatography. The content of the unpolymerized compound was equal to or lower than the detection limit. Thus, it was confirmed that the polymerizable compound represented by formula (I-3-a) could be polymerized without using a polymerization initiator, and that the content of the unpolymerized product remaining after the polymerization was equal to or less than the detection limit.

Example 8

A liquid crystal composition LC-4 containing the components below was prepared as a sample containing at least one compound selected from the compounds represented by general formula (II) and at least one compound selected from the compounds represented by general formulae (IIIa), (IIIb), and (IIIc) or at least one compound selected from the compounds represented by general formulae (IVa), (IVb), and (IVc).

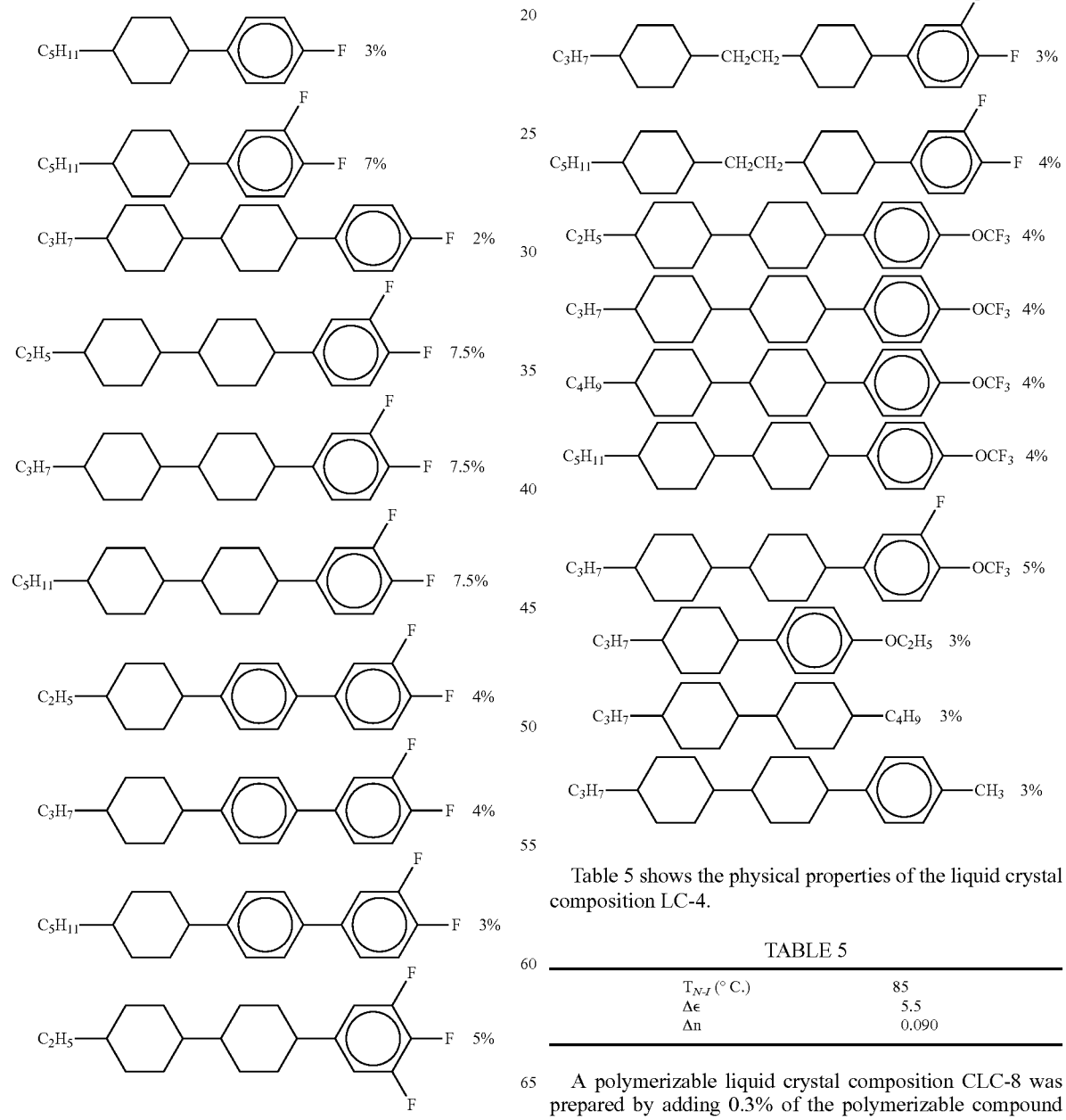

Table 5 shows the physical properties of the liquid crystal composition LC-4.

TABLE 5

| | |
|---|---|
| $T_{N-I}$ (° C.) | 85 |
| $\Delta\epsilon$ | 5.5 |
| $\Delta n$ | 0.090 |

A polymerizable liquid crystal composition CLC-8 was prepared by adding 0.3% of the polymerizable compound represented by formula (I-3-a) to 99.7% of the liquid crystal composition LC-4 and uniformly dissolving the polymerizable compound. It was found that the compound represented by formula (I-3-a) did not degrade the liquid crystal properties, and had a good compatibility as in Example 1. This polymerizable liquid crystal composition CLC-8 was stored in a cold place (at −20° C.) for one week. Consequently, deposition and the like did not occur. Thus, it was found that the polymerizable compound represented by formula (I-3-a) had a good compatibility with other liquid crystal compounds.

The polymerizable liquid crystal composition CLC-8 was injected, by a vacuum injection method, into a cell having an ITO electrode layer, the cell having a cell gap of 3.5 µm and including polyimide alignment layers that induce a homogeneous alignment. The pretilt angle of this cell was measured, and the liquid crystal cell was then irradiated with ultraviolet light using a high-pressure mercury lamp through a filter that cut ultraviolet light of 320 nm or less while applying a square wave of 1.8 V at a frequency of 1 kHz. The irradiation intensity on the surface of the cell was adjusted to 15 mW/cm$^2$, and the irradiation was performed for 600 seconds, thus fabricating a homogeneous-alignment liquid crystal display element in which the polymerizable compound in the polymerizable liquid crystal composition CLC-8 was polymerized. The pretilt angle after the ultraviolet irradiation of the element was 3.5 degrees whereas the pretilt angle before the ultraviolet irradiation was 0.1 degrees. Thus, a pretilt angle was provided, and the pretilt angle was fixed in a state in which the liquid crystal molecules were tilted with respect to the horizontal direction. The content of the unpolymerized compound represented by formula (I-3-a) in the element was analyzed by liquid chromatography. The content of the unpolymerized compound was equal to or lower than the detection limit. Thus, it was confirmed that the polymerizable compound represented by formula (I-3-a) could be polymerized without using a polymerization initiator, and that the content of the unpolymerized product remaining after the polymerization was equal to or less than the detection limit.

Evaluation

A voltage was applied to the liquid crystal display elements after polymerization, the liquid crystal display elements being fabricated in Examples 1 to 8 and Comparative Example 1, and the state of image sticking was visually observed with elapsed time. Table 6 shows the results. In Table 6, symbol A represents that no change was observed. Symbol B represents that image sticking was observed, and a larger number of symbol B's represents that the image sticking was more severe.

TABLE 6

| | After 10 hours | After 50 hours | After 100 hours | After 500 hours |
|---|---|---|---|---|
| Example 1 | A | A | A | A |
| Example 2 | | | | |
| Example 3 | | | | |
| Example 4 | | | | |
| Example 5 | | | | |
| Example 6 | | | | |
| Example 7 | | | | |
| Example 8 | | | | |
| Comparative Example 1 | | B | BB | BBB |

In the liquid crystal display element fabricated in Comparative Example 1, image sticking occurred after 48 hours from the start of display, and display damage was observed over the substantially entire surface after 168 hours. In contrast, in the liquid crystal display elements fabricated in Examples 1 to 8, a satisfactory display state was maintained even after 500 hours had passed. According to these results, it was possible to confirm the high reliability of liquid crystal display elements in which all polymerizable materials were polymerized and consumed, as in the compounds of the present invention. Furthermore, it was found that a decrease in the alignment-controlling force did not occur, and thus the polymers had a sufficiently high rigidity.

What is claimed is:
1. A polymerizable-compound-containing liquid crystal composition comprising:
as a first component, at least one compound selected from polymerizable compounds represented by general formula (I):

$$R^{11}-S^{11}-L^{11}-(M^{11}-L^{12})_m-M^{12}-L^{13}-(M^{13}-L^{14})_n-Z^{11} \qquad (I)$$

(wherein $R^{11}$ represents a group selected from groups represented by formulae (R-1) to (R-15):

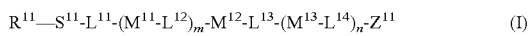

(R-1)

(R-2)

(R-3)

(R-4)

(R-5)

(R-6)

(R-7)

(R-8)

(R-9)

(R-10)

(R-11)

-continued

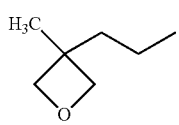
(R-12)

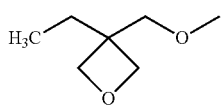
(R-13)

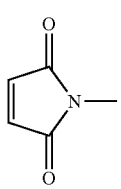
(R14)

HS——, (R-15)

$S^{11}$ represents an alkylene group having 1 to 12 carbon atoms or a single bond, where a methylene group in the alkylene group may be substituted with an oxygen atom, —COO—, —OCO—, or —OCOO— as long as oxygen atoms are not directly bonded to each other, $Z^{11}$ represents a hydrogen atom, a fluorine atom, a chlorine atom, a cyano group, a thiocyanate group, a trifluoromethoxy group, a trifluoromethyl group, a difluoromethoxy group, or an alkyl group having 1 to 12 carbon atoms where a methylene group in the alkyl group may be substituted with an oxygen atom, a sulfur atom, —CO—, —COO—, —OCO—, —OCOO—, —CH═CH—, or —C≡C— as long as oxygen atoms are not directly bonded to each other, or $Z^{11}$ represents —$S^{12}$—$R^{12}$ (where $R^{12}$ independently represents the same group as that represented by $R^{11}$, and $S^{12}$ independently represents the same group or bond as that represented by $S^{11}$), $L^{11}$, $L^{12}$, and $L^{14}$ each independently represent a single bond, —O—, —S—, —CH$_2$—, —OCH$_2$—, —CH$_2$O—, —CO—, —C$_2$H$_4$—, —COO—, —OCO—, —OCOOCH$_2$—, —CH$_2$OCOO—, —CO—NR$^a$—, —NR$^a$—CO—, —SCH$_2$—, —CH$_2$S—, —CH═CH—COO—, —COO—CH═CH—, —OCO—CH═CH—, —CH═CH—OCO—, —CH═CCH$_3$—COO—, —COO—CCH$_3$═CH—, —OCO—CCH$_3$═CH—, —CH═CCH$_3$—OCO—, —COOC$_2$H$_4$—, —OCOC$_2$H$_4$—, —C$_2$H$_4$OCO—, —C$_2$H$_4$COO—, —OCOCH$_2$—, —CH$_2$COO—, —CH$_2$OCO—, —COOCH$_2$—, —CH═CH—, —CF═CF—, —CF═CH—, —CH═CF—, —CF$_2$—, —CF$_2$O—, —OCF$_2$—, —CF$_2$CH$_2$—, —CH$_2$CF$_2$—, —CF$_2$CF$_2$—, or —C≡C— (where $R^a$ represents an alkyl group having 1 to 4 carbon atoms), $L^{13}$ represents —COOC$_2$H$_4$—, —OCOC$_2$H$_4$—, —C$_2$H$_4$COO—, or —C$_2$H$_4$COO—, $M^{11}$ and $M^{13}$ each independently represent a 1,4-phenylene group, a 1,4-cyclohexylene group, a pyridine-2,5-diyl group, a pyrimidine-2,5-diyl group, a piperidine-2,5-diyl group, a naphthalene-2,6-diyl group, an indane-2,5-diyl group, a tetrahydronaphthalene-2,6-diyl group, or a 1,3-dioxane-2,5-diyl group, $M^{11}$ and $M^{13}$ may each be independently unsubstituted, or a hydrogen atom contained in any of these groups independently represented by $M^{11}$ and $M^{13}$ may be substituted with an alkyl group, a halogenated alkyl group, an alkoxy group, a halogenated alkoxy group, a halogen atom, a cyano group, or a nitro group, $M^{12}$ represents a 1,4-phenylene group or a naphthalene-2,6-diyl group, $M^{12}$ may be unsubstituted, or a hydrogen atom contained in the 1,4-phenylene group or the naphthalene-2,6-diyl group may be substituted with an alkyl group, a halogenated alkyl group, an alkoxy group, a halogenated alkoxy group, a halogen atom, a cyano group, or a nitro group, m represents 0 or 1, n represents 1, 2, or 3, when n represents 2 or 3, $M^{13}$s, the number of which is 2 or 3, may be the same or different and $L^{14}$s, the number of which is 2 or 3, may be the same or different);

as a second component, at least one compound represented by general formula (II):

$$R^{21}\text{-}M^{21}\text{-}L^{21}\text{-}M^{22}\text{-}(L^{22}\text{-}M^{23})_o\text{-}R^{22} \qquad (II)$$

(wherein $R^{21}$ and $R^{22}$ each independently represent an alkyl group having 1 to 10 carbon atoms or an alkenyl group having 2 to 10 carbon atoms, one methylene group or two or more non-adjacent methylene groups in the alkyl group or the alkenyl group may each be substituted with —O— or —S—, and one or more hydrogen atoms in the alkyl group or the alkenyl group may each be substituted with a fluorine atom or a chlorine atom, $M^{21}$, $M^{22}$, and $M^{23}$ each independently represent a group selected from the group consisting of (a) a trans-1,4-cyclohexylene group (where one methylene group or two or more non-adjacent methylene groups in the trans-1,4-cyclohexylene group may each be substituted with —O— or —S—), (b) a 1,4-phenylene group (where one —CH═ group or two or more non-adjacent —CH═ groups in the 1,4-phenylene group may each be substituted with a nitrogen atom), a 2-fluoro-1,4-phenylene group, a 3-fluoro-1,4-phenylene group, a 3,5-difluoro-1,4-phenylene group, and (c) a 1,4-cyclohexenylene group, a 1,4-bicyclo(2.2.2)octylene group, a piperidine-2,5-diyl group, a naphthalene-2,6-diyl group, a decahydronaphthalene-2,6-diyl group, and a 1,2,3,4-tetrahydronaphthalene-2,6-diyl group, o represents 0, 1, or 2, $L^{21}$ and $L^{22}$ each independently represent a single bond, —CH$_2$CH$_2$—, —(CH$_2$)$_4$—, —OCH$_2$—, —CH$_2$O—, —OCF$_2$—, —CF$_2$O—, —CH═CH—, —CH═N—N═CH—, or —C≡C—, when a plurality of $L^{22}$s is present, $L^{22}$s may be the same or different, and when a plurality of $M^{23}$s is present, $M^{23}$s may be the same or different); and as a third component, at least one compound selected from the group consisting of compounds represented by general formulae (IIIa), (IIIb), and (IIIc):

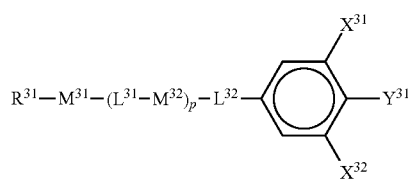
(IIIa)

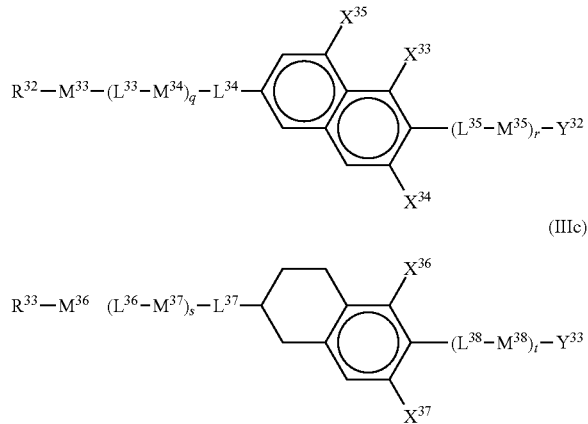

(IIIb)

(IIIc)

(wherein $R^{31}$, $R^{32}$, and $R^{33}$ each independently represent an alkyl group having 1 to 10 carbon atoms or an alkenyl group having 2 to 10 carbon atoms, one methylene group or two or more non-adjacent methylene groups in the alkyl group or the alkenyl group may each be substituted with —O— or —S—, and one or more hydrogen atoms in the alkyl group or the alkenyl group may each be substituted with a fluorine atom or a chlorine atom, $M^{31}$, $M^{32}$, $M^{33}$, $M^{34}$, $M^{35}$, $M^{36}$, $M^{37}$, and $M^{38}$ each independently represent a group selected from the groups consisting of (d) a trans-1,4-cyclohexylene group (where one methylene group or two or more non-adjacent methylene groups in the trans-1,4-cyclohexylene group may each be substituted with —O— or —S—), (e) a 1,4-phenylene group (where one —CH═ group or two or more non-adjacent —CH═ groups in the 1,4-phenylene group may each be substituted with —N═), a 3-fluoro-1,4-phenylene group, and a 3,5-difluoro-1,4-phenylene group, and (f) a 1,4-cyclohexenylene group, a 1,4-bicyclo(2.2.2)octylene group, a piperidine-2,5-diyl group, a naphthalene-2,6-diyl group, a 1,2,3,4-tetrahydronaphthalene-2,6-diyl group, and a decahydronaphthalene-2,6-diyl group, a hydrogen atom contained in any of the groups (d), (e), and (f) may be substituted with a cyano group, a fluorine atom, a trifluoromethyl group, a trifluoromethoxy group, or a chlorine atom, $L^{31}$, $L^{32}$, $L^{33}$, $L^{34}$, $L^{35}$, $L^{36}$, $L^{37}$, and $L^{38}$ each independently represent a single bond, —COO—, —OCO—, —CH$_2$CH$_2$—, —(CH$_2$)$_4$—, —OCH$_2$—, —CH$_2$O—, —OCF$_2$—, —CF$_2$O—, or —C≡C—, when a plurality of $M^{32}$s, $M^{34}$s, $M^{35}$s, $M^{37}$s, $M^{38}$s, $L^{31}$s, $L^{33}$s, $L^{35}$s, $L^{36}$s, and/or $L^{38}$s are present, they may be the same or different, $X^{31}$, $X^{32}$, $X^{33}$, $X^{34}$, $X^{35}$, $X^{36}$, and $X^{37}$ each independently represent a hydrogen atom or a fluorine atom, $Y^{31}$, $Y^{32}$, and $Y^{33}$ each independently represent a fluorine atom, a chlorine atom, a cyano group, a thiocyanate group, a trifluoromethoxy group, a trifluoromethyl group, a 2,2,2-trifluoroethyl group, or a difluoromethoxy group, p, q, r, s, and t each independently represent 0, 1, or 2, but q+r and s+t are each 2 or less), or at least one compound selected from the group consisting of compounds represented by general formulae (IVa), (IVb), and (IVc):

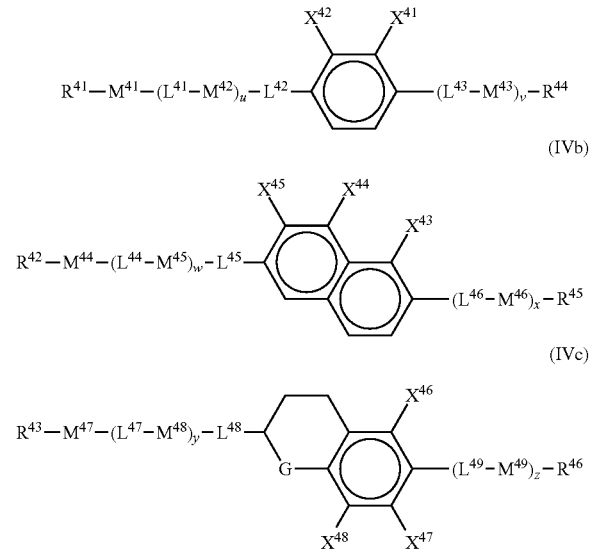

(IVa)

(IVb)

(IVc)

(wherein $R^{41}$, $R^{42}$, $R^{43}$, $R^{44}$, $R^{45}$, and $R^{46}$ each independently represent an alkyl group having 1 to 10 carbon atoms or an alkenyl group having 2 to 10 carbon atoms, one methylene group or two or more non-adjacent methylene groups in the alkyl group or the alkenyl group may each be substituted with —O— or —S—, and one or more hydrogen atoms in the alkyl group or the alkenyl group may each be substituted with a fluorine atom or a chlorine atom, $M^{41}$, $M^{42}$, $M^{43}$, $M^{44}$, $M^{45}$, $M^{46}$, $M^{47}$, $M^{48}$, and $M^{49}$ each independently represent a group selected from the groups consisting of (g) a trans-1,4-cyclohexylene group (where one methylene group or two or more non-adjacent methylene groups in the trans-1,4-cyclohexylene group may each be substituted with —O— or —S—), (h) a 1,4-phenylene group (where one —CH═ group or two or more non-adjacent —CH═ groups in the 1,4-phenylene group may each be substituted with a nitrogen atom), and (i) a 1,4-cyclohexenylene group, a 1,4-bicyclo(2.2.2)octylene group, a piperidine-2,5-diyl group, a naphthalene-2,6-diyl group, a 1,2,3,4-tetrahydronaphthalene-2,6-diyl group, and a decahydronaphthalene-2,6-diyl group, a hydrogen atom contained in any of these groups (g), (h), and (i) may be substituted with a cyano group, a fluorine atom, a trifluoromethyl group, a trifluoromethoxy group, or a chlorine atom, $L^{41}$, $L^{42}$, $L^{43}$, $L^{44}$, $L^{45}$, $L^{46}$, $L^{47}$, $L^{48}$, and $L^{49}$ each independently represent a single bond, —COO—, —OCO—, —CH$_2$CH$_2$—, —(CH$_2$)$_4$—, —OCH$_2$—, —CH$_2$O—, —OCF$_2$—, —CF$_2$O—, or —C≡C—, when a plurality of $M^{42}$s, $M^{43}$s, $M^{45}$s, $M^{46}$s, $M^{48}$s, $M^{49}$s, $L^{41}$s, $L^{43}$s, $L^{44}$s, $L^{46}$s, $M^{47}$s and/or $L^{49}$s are present, they may be the same or different, $X^{41}$ and $X^{42}$ each independently represent a trifluoromethyl group, a trifluoromethoxy group, or a fluorine atom, $X^{43}$, $X^{44}$, $X^{45}$, $X^{46}$, $X^{47}$ and $X^{48}$ each independently represent a hydrogen atom, a trifluoromethyl group, a trifluoromethoxy group, or a fluorine atom, however, at least one of $X^{41}$ and $X^{42}$ represents a fluorine atom, one of $X^{43}$, $X^{44}$, and $X^{45}$ represents a fluorine atom, one of $X^{46}$, $X^{47}$, and $X^{48}$ represents a fluorine atom, $X^{46}$ and $X^{47}$ do not represent fluorine atoms at the same time, and $X^{46}$ and $X^{48}$ do not represent fluorine atoms at the same time, G represents a methylene group or —O—, u, v, w, x, y, and z each independently represent 0, 1, or 2, but u+v, w+x, and y+z are each 2 or less).

2. The polymerizable-compound-containing liquid crystal composition according to claim 1, wherein when $Z^{11}$ in general formula (I) is —$S^{12}$—$R^{12}$, least one of $S^{11}$ and $S^{12}$ represents an alkylene group having 2 to 12 carbon atoms where a methylene group in the alkylene group may be substituted with an oxygen atom, —COO—, —OCO—, or —OCOO— as long as oxygen atoms are not directly bonded to each other.

3. The polymerizable-compound-containing liquid crystal composition according to claim 1, wherein $R^{11}$ and $R^{12}$ in general formula (I) each independently represent formula (R-1) or (R-2).

4. The polymerizable-compound-containing liquid crystal composition according to claim 1, wherein the liquid crystal composition is used in a liquid crystal display element including a pair of substrates, a liquid crystal interposed between the substrates, a transparent electrode, and a polarizer, in which a liquid crystal alignment capability is provided by polymerizing a polymerizable compound contained in the liquid crystal composition.

5. The polymerizable-compound-containing liquid crystal composition according to claim 1, wherein the liquid crystal composition contains 0.01% to 2% by mass of the at least one compound selected from the polymerizable compounds represented by general formula (I), 5% to 70% by mass of the at least one compound selected from the compounds represented by general formula (II), and 5% to 70% by mass of the at least one compound selected from the group consisting of the compounds represented by general formulae (IIIa), (IIIb), and (IIIc) or the compounds represented by general formulae (IVa), (IVb), and (IVc).

6. The polymerizable-compound-containing liquid crystal composition according to claim 1, wherein the liquid crystal composition contains, as the third component, at least one compound selected from the group consisting of the compounds represented by general formulae (IVa), (IVb), and (IVc).

7. A liquid crystal display element comprising:
the polymerizable-compound-containing liquid crystal composition according to claim 1,
wherein a liquid crystal alignment capability is provided by polymerizing the polymerizable compound contained in the polymerizable-compound-containing liquid crystal composition.

8. The liquid crystal display element according to claim 7, wherein a dielectric anisotropy of the polymerizable-compound-containing liquid crystal composition is negative.

9. The polymerizable-compound-containing liquid crystal composition according to claim 2, wherein $R^{11}$ and $R^{12}$ in general formula (I) each independently represent formula (R-1) or (R-2).

10. The polymerizable-compound-containing liquid crystal composition according to claim 2, wherein the liquid crystal composition is used in a liquid crystal display element including a pair of substrates, a liquid crystal interposed between the substrates, a transparent electrode, and a polarizer, in which a liquid crystal alignment capability is provided by polymerizing a polymerizable compound contained in the liquid crystal composition.

11. The polymerizable-compound-containing liquid crystal composition according to claim 3, wherein the liquid crystal composition is used in a liquid crystal display element including a pair of substrates, a liquid crystal interposed between the substrates, a transparent electrode, and a polarizer, in which a liquid crystal alignment capability is provided by polymerizing a polymerizable compound contained in the liquid crystal composition.

12. The polymerizable-compound-containing liquid crystal composition according to claim 2, wherein the liquid crystal composition contains 0.01% to 2% by mass of the at least one compound selected from the polymerizable compounds represented by general formula (I), 5% to 70% by mass of the at least one compound selected from the compounds represented by general formula (II), and 5% to 70% by mass of the at least one compound selected from the group consisting of the compounds represented by general formulae (IIIa), (IIIb), and (IIIc) or the compounds represented by general formulae (IVa), (IVb), and (IVc).

13. The polymerizable-compound-containing liquid crystal composition according to claim 3, wherein the liquid crystal composition contains 0.01% to 2% by mass of the at least one compound selected from the polymerizable compounds represented by general formula (I), 5% to 70% by mass of the at least one compound selected from the compounds represented by general formula (II), and 5% to 70% by mass of the at least one compound selected from the group consisting of the compounds represented by general formulae (IIIa), (IIIb), and (IIIc) or the compounds represented by general formulae (IVa), (IVb), and (IVc).

14. The polymerizable-compound-containing liquid crystal composition according to claim 4, wherein the liquid crystal composition contains 0.01% to 2% by mass of the at least one compound selected from the polymerizable compounds represented by general formula (I), 5% to 70% by mass of the at least one compound selected from the compounds represented by general formula (II), and 5% to 70% by mass of the at least one compound selected from the group consisting of the compounds represented by general formulae (IIIa), (IIIb), and (IIIc) or the compounds represented by general formulae (IVa), (IVb), and (IVc).

15. The polymerizable-compound-containing liquid crystal composition according to claim 2, wherein the liquid crystal composition contains, as the third component, at least one compound selected from the group consisting of the compounds represented by general formulae (IVa), (IVb), and (IVc).

16. The polymerizable-compound-containing liquid crystal composition according to claim 3, wherein the liquid crystal composition contains, as the third component, at least one compound selected from the group consisting of the compounds represented by general formulae (IVa), (IVb), and (IVc).

17. The polymerizable-compound-containing liquid crystal composition according to claim 4, wherein the liquid crystal composition contains, as the third component, at least one compound selected from the group consisting of the compounds represented by general formulae (IVa), (IVb), and (IVc).

18. A liquid crystal display element comprising:
the polymerizable-compound-containing liquid crystal composition according to claim 2,
wherein a liquid crystal alignment capability is provided by polymerizing the polymerizable compound contained in the polymerizable-compound-containing liquid crystal composition.

19. A liquid crystal display element comprising:
the polymerizable-compound-containing liquid crystal composition according to claim 3,
wherein a liquid crystal alignment capability is provided by polymerizing the polymerizable compound contained in the polymerizable-compound-containing liquid crystal composition.

20. A liquid crystal display element comprising:
the polymerizable-compound-containing liquid crystal composition according to claim 4,
wherein a liquid crystal alignment capability is provided by polymerizing the polymerizable compound contained in the polymerizable-compound-containing liquid crystal composition.

* * * * *